Dec. 10, 1940.  R. H. LAWSON  2,224,157
MACHINE FOR SHAPING UPPERS OVER LASTS
Filed May 4, 1939  12 Sheets-Sheet 1

INVENTOR:
Robert H. Lawson
By his Attorney
Victor Cobb.

Dec. 10, 1940.  R. H. LAWSON  2,224,157
MACHINE FOR SHAPING UPPERS OVER LASTS
Filed May 4, 1939  12 Sheets-Sheet 3

INVENTOR:
Robert H. Lawson
By his attorney
Victor Coll.

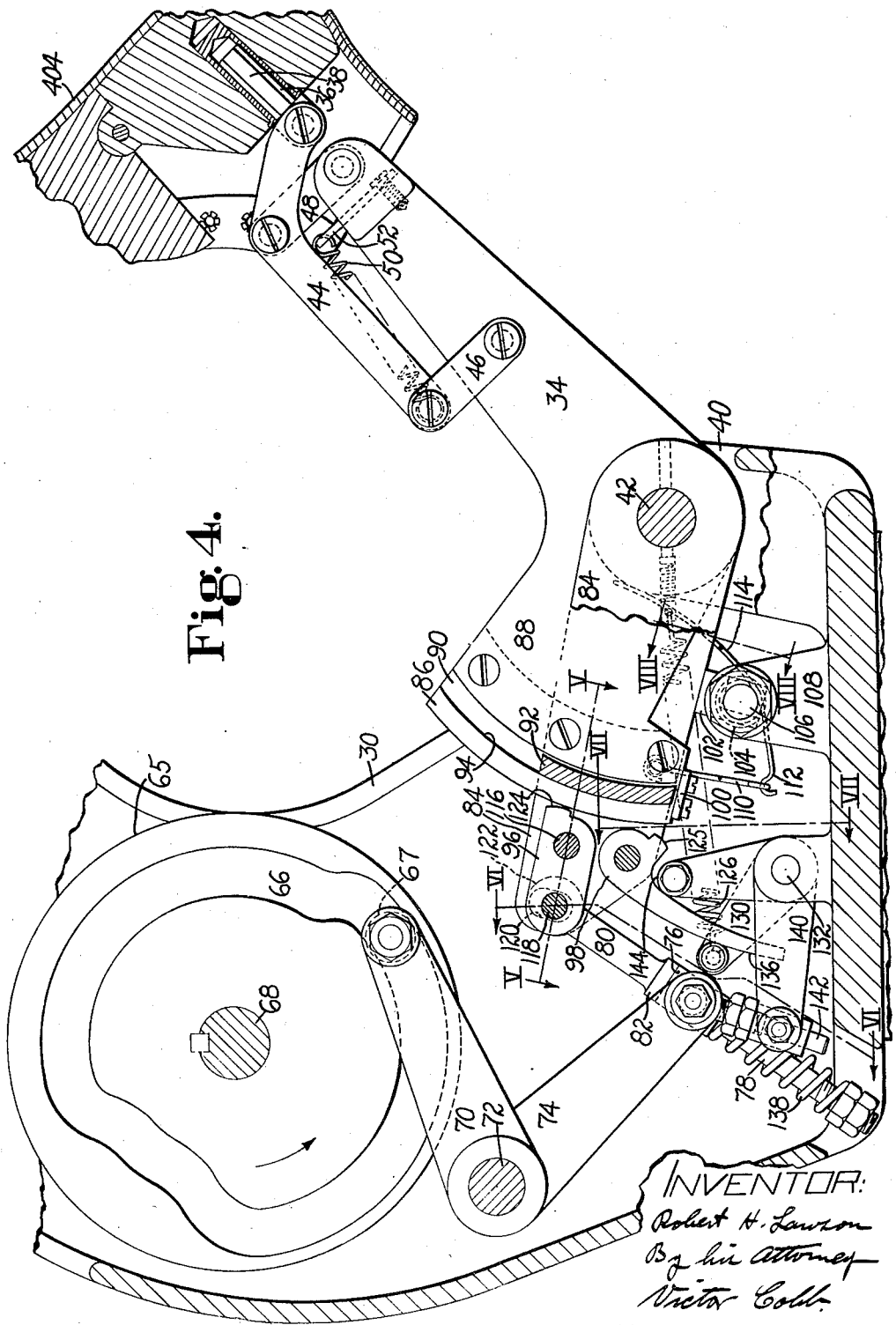

Dec. 10, 1940.    R. H. LAWSON    2,224,157
MACHINE FOR SHAPING UPPERS OVER LASTS
Filed May 4, 1939    12 Sheets-Sheet 5
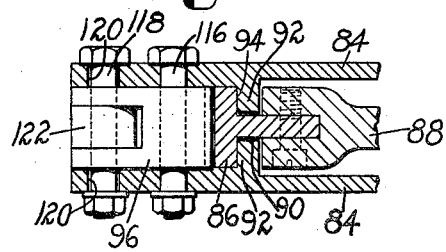
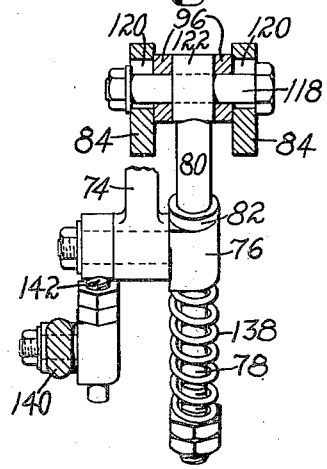
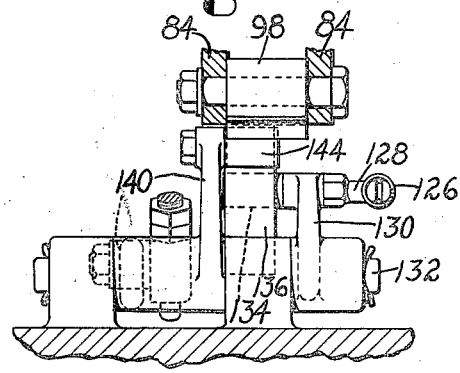
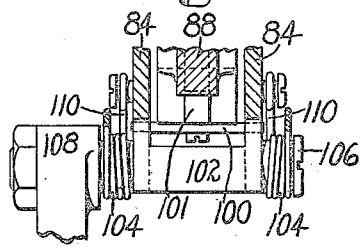
INVENTOR:
Robert H. Lawson
By his Attorney
Victor Cobb Dec. 10, 1940.    R. H. LAWSON    2,224,157
MACHINE FOR SHAPING UPPERS OVER LASTS
Filed May 4, 1939    12 Sheets-Sheet 6

INVENTOR:
Robert H. Lawson
By his Attorney
Victor Cobb

Dec. 10, 1940.  R. H. LAWSON  2,224,157
MACHINE FOR SHAPING UPPERS OVER LASTS
Filed May 4, 1939  12 Sheets-Sheet 8

INVENTOR:
Robert H. Lawson
By his attorney
Victor Cobb

Dec. 10, 1940.    R. H. LAWSON    2,224,157
MACHINE FOR SHAPING UPPERS OVER LASTS
Filed May 4, 1939    12 Sheets-Sheet 9

INVENTOR:
Robert H. Lawson
By his attorney
Victor Cobb

Dec. 10, 1940. R. H. LAWSON 2,224,157
MACHINE FOR SHAPING UPPERS OVER LASTS
Filed May 4, 1939 12 Sheets-Sheet 11

INVENTOR:
Robert H. Lawson
By his attorney
Vista Cobb

Patented Dec. 10, 1940

2,224,157

UNITED STATES PATENT OFFICE 2,224,157

MACHINE FOR SHAPING UPPERS OVER LASTS

Robert H. Lawson, Beverly, Mass., assignor to United Shoe Machinery Corporation, Borough of Flemington, N. J., a corporation of New Jersey Application May 4, 1939, Serial No. 271,802

58 Claims. (Cl. 12—14)

The present invention relates to machines for shaping uppers over lasts and is herein illustrated in its application to a machine for shaping over lasts uppers provided with outsole-attaching extensions and insole-attaching extensions. The illustrated machine is particularly suited for operation on prewelted uppers of the type illustrated in United States Letters Patent No. 2,119,801, granted June 7, 1938, on an application of W. C. Vizard. Uppers of this type are provided with a welt having two upward extensions between which the bottom margin of an upper is secured, an outward extension for attaching an outsole, and an extension which is secured to an insole. It is to be understood, however, that the invention is not limited to machines for shaping prewelted uppers over lasts but is applicable, in certain of its aspects, to machines for shaping other types of uppers, for example, stitchdown uppers in which the lining is lasted inwardly over an insole.

It is an object of the present invention to provide a machine which will automatically shape over lasts uppers having outsole-attaching extensions and insole-attaching extensions, eliminate much of the hand work heretofore required in the manufacture of such shoes and provide shoes which are better shaped to their lasts and of more uniform quality than such shoes heretofore produced.

To this end the present invention, in accordance with one important feature, provides in a machine for shaping uppers over lasts a gripper for engaging an outsole-attaching extension of an upper and holding the upper under tension which is applied to it in shaping the upper over a last, a member for forcing the bottom margin of the upper into lasted relation to the periphery of the last and the edge face of an insole on the last bottom, a wiper for wiping an insole-attaching extension of the upper in over the margin of the insole, and a carrier for said gripper, said member and said wiper. In the illustrated machine there are two such members comprising a pair of end-embracing plates mounted on a pair of carriers pivotally mounted for swinging movement about a common axis adjacent to the toe end of the upper. The illustrated machine also is provided with a plurality of such grippers and wipers arranged to operate on an end portion of an upper and means for causing the grippers to grip the outsole-attaching extension of the upper and to hold it during the operation of the upper-embracing plates and the wipers. The illustrated grippers hold the forepart of the upper while a last is forced into it and thereafter while the insole-attaching extension is lasted and secured to an insole on the last bottom. For forcing the bottom margin of the upper against the end-embracing plates before the grippers are closed the illustrated machine, in accordance with a further feature of the invention, is provided with a member constructed and arranged to enter the upper and force the upper into engagement with the end-embracing plates and then withdraw from the upper to admit the last. Preferably and as herein illustrated this member also operates after the last has been forced into the upper to wipe the insole-attaching extension of the upper in over the margin of an insole on the last bottom. In forcing the bottom margin of the upper against the end-embracing plates the member above referred to also positions the outsole-attaching extension of the upper relatively to one of the grippers and holds the upper against the end-embracing plates until the gripper closes on the outsole-attaching extension and holds the margin of the upper in the position in which said member has located it.

The upper is stretched lengthwise thereof to receive the forepart of the last by the operation of a work support or jack for the rear part of the last and the upper, and after the last has been forced into the upper the jack is moved in the opposite direction to force the toe end of the last into the toe end of the upper preparatory to the attachment of the toe end of the upper to the insole. For moving the jack in a direction to tension the upper for the reception of the last the illustrated machine is provided with power-operated means and connections therefrom to the jack including a dog arranged for gripping engagement with the jack. When the machine is at rest the dog is held in inoperative position to permit the jack to be moved freely in a direction lengthwise of the upper to facilitate the location of the upper relatively to the grippers. The last is moved in a direction to force its toe end into the toe end of the upper by the above-mentioned power-operated means operating through another jack-gripping-member or dog. This dog, similarly to the one above referred to, is held in an inoperative position when the machine is at rest to permit the jack to move freely lengthwise of the upper. The jack has a fixed movement for tensioning the upper lengthwise thereof, the extent of such movement being sufficient to permit the forepart of the last to move downwardly into the forepart of the upper without rubbing against the toe end of the upper. In tensioning the upper lengthwise the work support acts directly against the last, the toe end of the last being positioned for the beginning of the tensioning operation against a member which is located in predetermined relation to the upper. In accordance with a further feature of the invention this member is the member which operates as above described to position the upper relatively to the end-embracing plates and to wipe the insole-attaching extension in over an insole on the last bottom. To this end the member is moved out of the upper after it has brought the upper into engagement with the end-embracing plates and is then located in predetermined relation to the end-embracing plates lengthwise of the upper to gage the lengthwise position of the last.

In the shaping of uppers provided with outturned outsole-attaching extensions it is desirable that a well-defined crease be formed at the apex of the angle defined by the upper and its outsole-attaching extension in order to give the bottom portion of the shoe a finished appearance similar to the appearance of a Goodyear welt shoe. To assist in the formation of such a crease in the upper the illustrated machine is provided with a pair of end-embracing upper-indenting plates which are mounted on and operate with the end-embracing plates above referred to. In order to obviate the requirement of separate sets of plates for right and left foot uppers the upper-indenting plates and end-embracing plates, in accordance with a further feature of the invention, are constructed and arranged to be inverted independently of each other and replaced in the machine in their inverted position.

In accordance with a further feature of the invention, the illustrated machine is provided with a wiper assembly comprising a wiper and carrying means therefor operable to advance and retract the wiper and a member on which the wiper assembly is mounted for swinging movements to orient the wiper relatively to the work preparatory to the operation of the machine on a run of shoes, said member being movable to position the wiper assembly in determinate relation to the work for the beginning of the wiping operation. In the illustrated machine a gripper is incorporated in each of the wiper assemblies. For operating the gripper and the wiper an actuator is provided, said actuator being constructed and arranged first to effect the closing of the gripper and thereafter to operate the wiper. In orienting the wipers relatively to the work preparatory to the operation of the machine on a run of shoes, the grippers are similarly oriented, the gripper and wiper assembly moving as a unit in the orientation of said parts. It is important that the grippers be correctly oriented because they are constructed to engage a substantial amount of the outsole attaching extension of the upper and unless they are correctly oriented, they will not engage the extension uniformly and their gripping action will not be fully effective.

In accordance with a further feature of the invention, the orientation of the gripper and wiper assemblies relatively to the work occurs in mounting the end-embracing plates in the machine, said plates as herein illustrated being constructed and arranged to be seated in recesses provided in the members on which said assemblies are mounted.

For holding the insole-attaching extension of the upper against the wipers in order to prevent its dislocation by the last as it is depressed into the upper the illustrated machine is preferably provided with means mounted on the wipers for holding the insole-attaching extension against the wipers during the downward movement of the last. The holding means, which is illustrated as a spring operated clamping member, is mounted on the side wipers only. No such clamp is required at the toe end of the upper since the toe end of the last is spaced from the upper during the depression of the last into the upper.

These and other features of the invention will now be described with reference to the accompanying drawings and pointed out in the appended claims.

In the drawings:

Fig. 4 is a sectional elevation taken substantially on the line IV—IV of Fig. 3, including part of a shoe on the work support, the upper portion of the head being broken away;

Fig. 5 is a sectional view taken substantially on the line V—V of Fig. 4;

Fig. 6 is a sectional view taken on the line VI—VI of Fig. 4;

Fig. 7 is a sectional view taken on the line VII—VII of Fig. 4;

Fig. 8 is a sectional view taken on the line VIII—VIII of Fig. 4;

Figure 1:
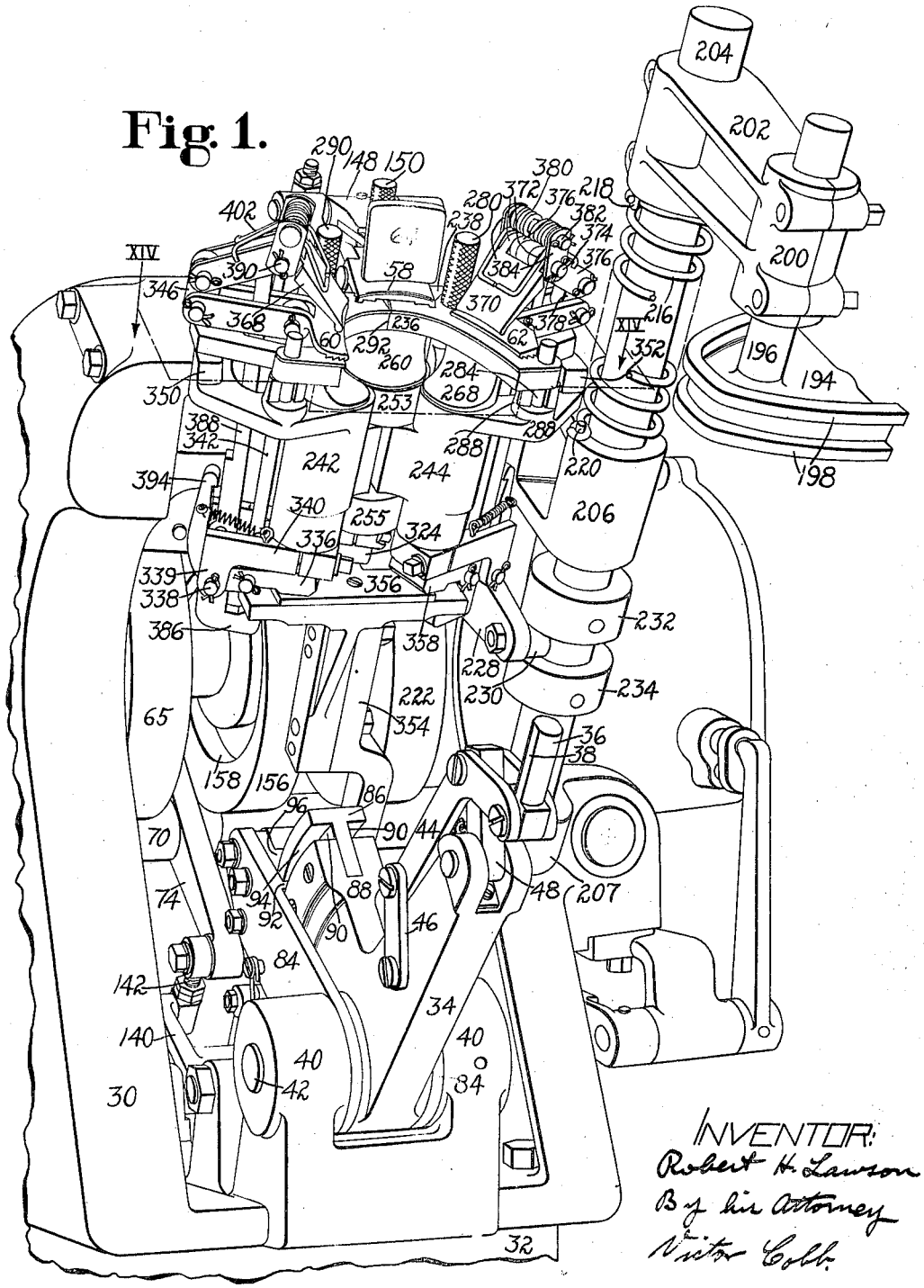
Fig. 1 is a perspective view illustrating the head of a machine embodying the present invention.

The illustrated machine is constructed to operate on a shoe upper having an inwardly extending insole attaching flange and an outwardly extending outsole attaching flange. The machine is particularly suited for use in the manufacture of a prewelted shoe such as that illustrated and described in the Vizard patent hereinbefore referred to. The shoe illustrated in the Vizard patent has a scant upper which extends only to the bottom of the last and a welt having upwardly extending flanges between which the upper is secured, an insole attaching extension, and an outturned outsole attaching extension.

The illustrated machine is provided with a work support or jack on which is mounted the rear part of a last on which an upper has been assembled. When the last is mounted on the work support its forepart extends upwardly from the forepart of the upper and the forepart of the upper has not been shaped, except to the extent that such shaping is incidental to the stitching of a welt to the upper. The machine is provided with gripping mechanism which engages the outsole attaching extension, means operating on the jack to tension the upper lengthwise thereof preparatory to the depression of the forepart of the last into the upper, a depressor for forcing the forepart of the last into the upper, forepart embracing members for gripping the forepart of the upper against the last, and wiper members which operate after the forepart embracing members have gripped the upper against the last to work the insole attaching extension inwardly over the margin of an insole on the last bottom. Preferably both the insole attaching extension and the margin of the insole have been coated with cement for attaching said parts together as the insole attaching extension is worked inwardly over the margin of the insole. The jack, in stretching the upper for the reception of the last, moves away from the forepart of the supported upper a fixed amount which is measured from the position in which the jack is located by bringing the toe end of the last against a gage which is located in predetermined relation to the forepart embracing members. After the jack has operated to tension the upper lengthwise and the forepart of the last has been depressed into the forepart of the supported upper the jack is moved toward the forepart of the upper to bring the toe end of the last firmly into engagement with the toe end of the upper, the forepart embracing members serving as an abutment against which the toe portions of the last and upper are forced by said reverse movement of the jack. After said reverse movement of the jack is completed and while the jack remains at the limit of its reverse movement the forepart embracing members close and grip the upper against the last, and the wipers above referred to advance to effect the cement attachment of the insole attaching flange of the upper to the margin of the insole. Thus, the upper is secured to the insole while it is held closely against the last.

Figure 3:
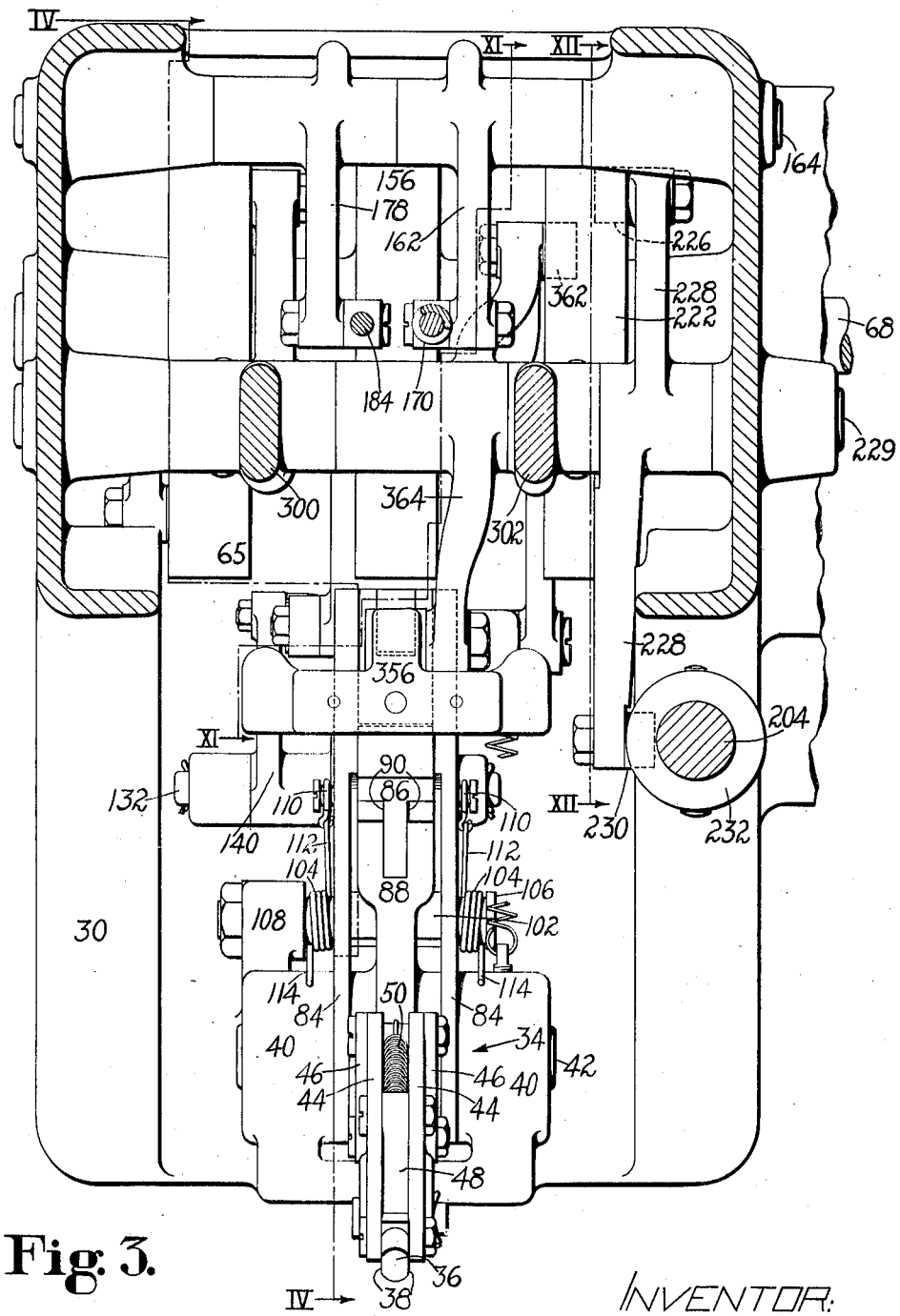
Fig. 3 is a plan view similar to Fig. 2 with the shoe removed and the work engaging parts omitted to show underlying parts.

Referring to Fig. 1, the machine head is indicated generally by the numeral 30, said head being mounted on a standard the upper portion of which is identified by the numeral 32. A jack 34 projects upwardly and forwardly from the base of the head and is provided with a last pin 36 which fits rather closely into the thimble provided in the rear part of a last but is slabbed off on opposite sides, as shown at 38 in Fig. 1, to permit a slight lateral rocking movement of the last. The lower portion of the jack 34 is positioned between upward extensions 40 of the base of the head and is mounted for swinging movement on a shaft 42 mounted in said upward extensions. The last pin 36 is mounted for swinging movement in the direction of the length of a last supported thereon between parallel L-shaped members 44 which are pivoted at their lower ends to the rear ends of links 46 (Figs. 1 and 3) the forward ends of which are pivoted to opposite sides of the jack. At their elbows the L-shaped members 44 are pivoted to a link 48 positioned between them and arranged parallel to the links 46, the forward portion of the link 48 being pivotally mounted in the bifurcated upper end of the jack. Referring to Fig. 4, the last pin is yieldingly held against downward movement by a spring 50 extending from the lower ends of the L-shaped members 44 to a plate 52 projecting from the upper portion of the jack. This spring sustains the weight of the rear part of a last and upper mounted on the pin 36 but without offering substantial resistance to downward movement of the last to the extent afforded by the separation of the base of the last pin 36 from the forward end of the link 48 as shown in Fig. 4. Thus it will be seen that the last and upper are free to move bodily heightwise thereof and are free to swing about the pivotal connection of the last pin with the L-shaped members 44 and are also free to rock laterally somewhat by reason of the slabbed-off construction of the last pin. Thus the last is universally adjustable in order to bring the forepart of an insole on the last bottom into the proper position for the operation of the wipers that work the insole attaching extension of the welt over the margin of the insole.

Figure 2:
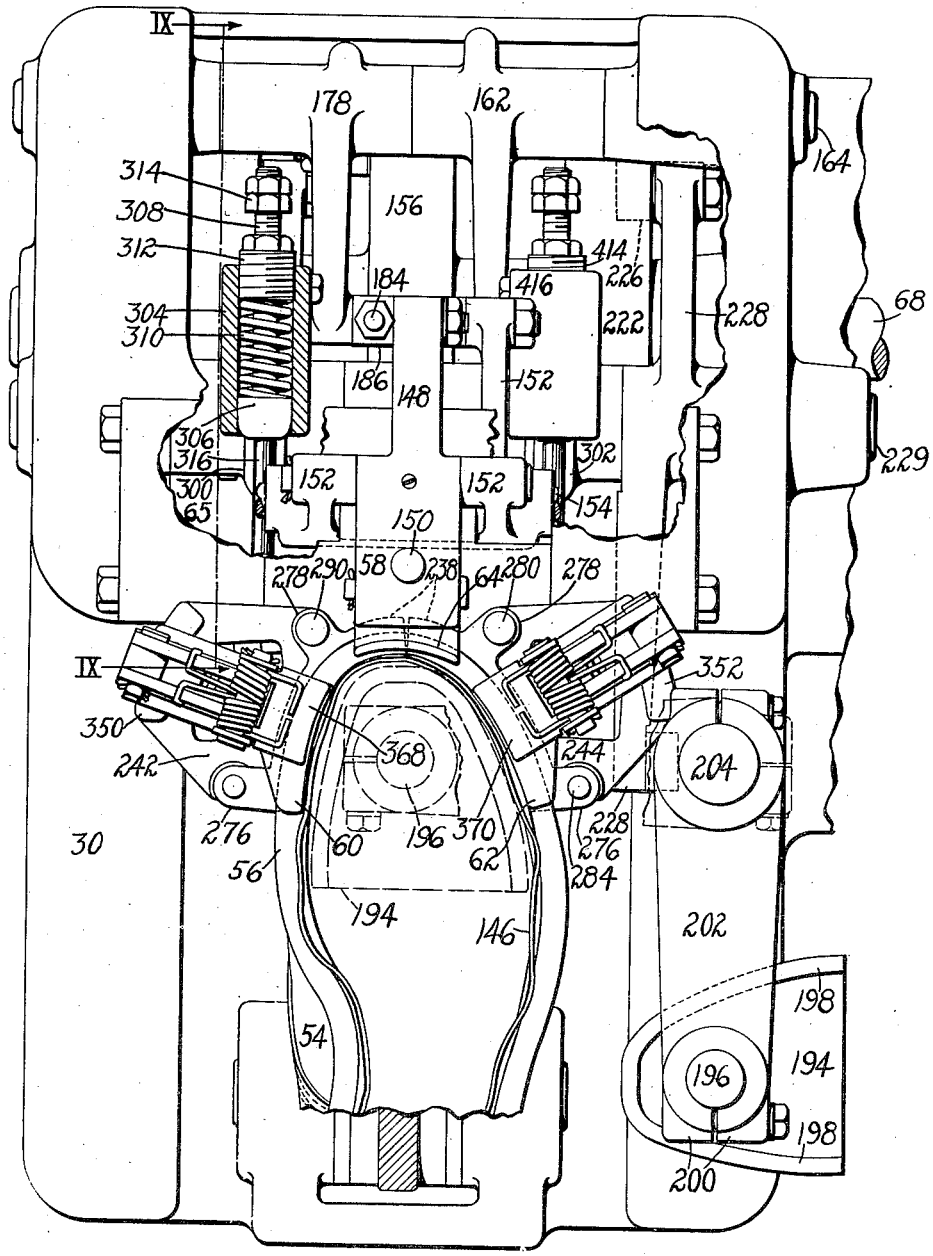
Fig. 2 is a plan view of the machine illustrated in Fig. 1 with a shoe mounted thereon, the clutch mechanism and the top of the frame being broken away and part of the operating mechanism shown in section.
Figure 16:
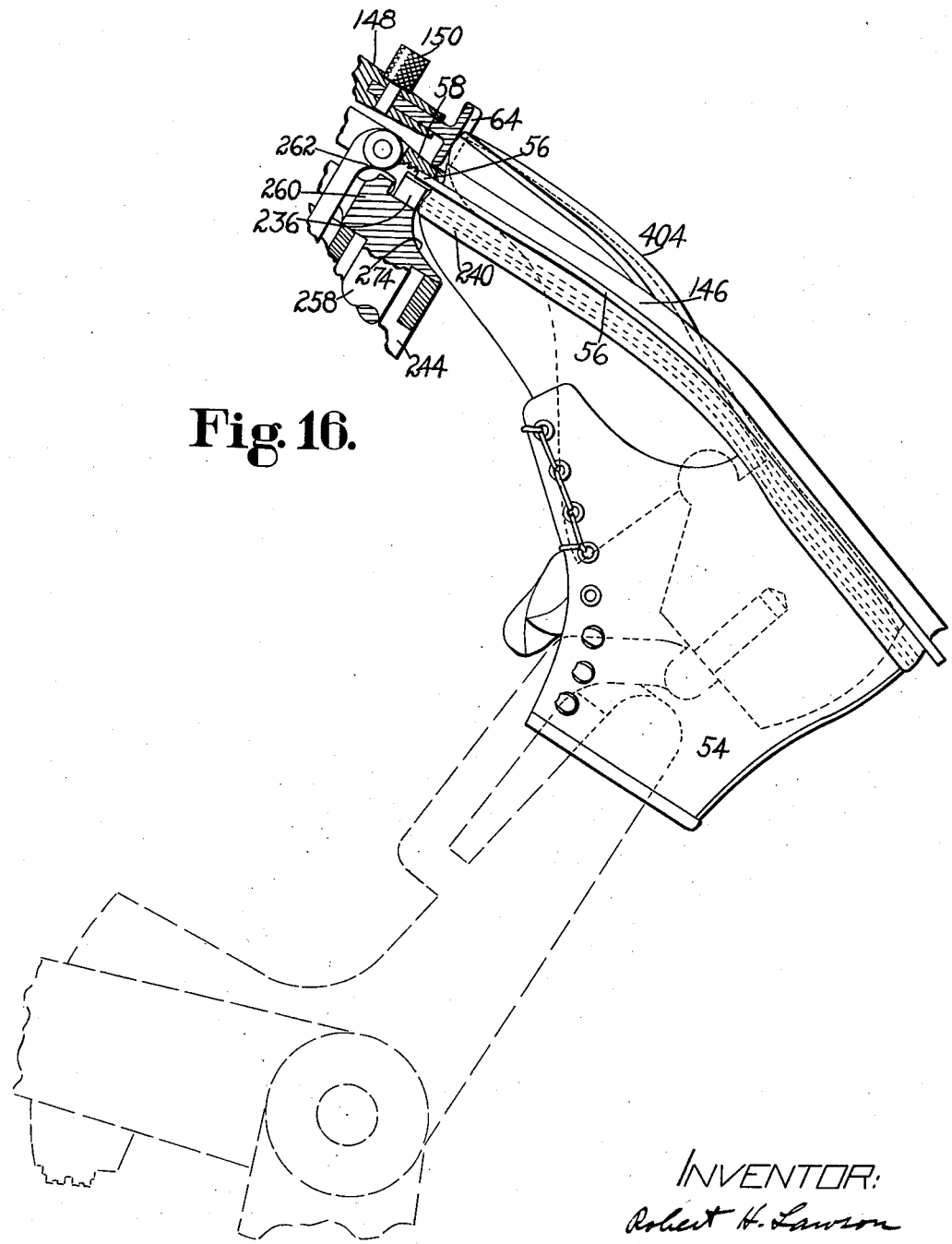
Fig. 16 is a detail view in side elevation illustrating an upper on its last mounted on the work support which is shown in broken lines, fragments of the mechanism for operating on the toe end of the upper being shown in section as they appear at an intermediate stage in the operation of the machine.
Figure 17:
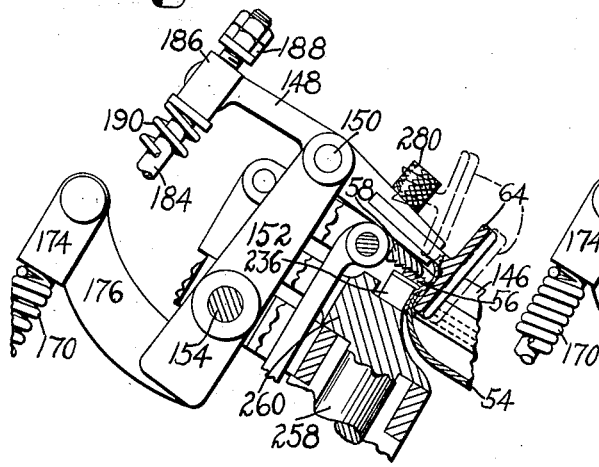
Figs. 17 and 18 are detail views in side elevation showing the mechanism illustrated in Fig. 16 at different stages in the operation of the machine, certain parts being shown in section and other parts broken away to show certain concealed parts.
Figure 18:
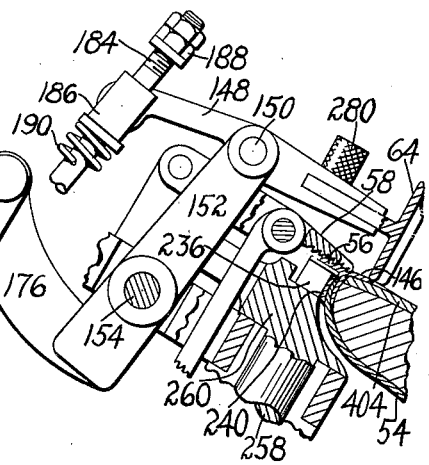

The upper is arranged for the operation of the illustrated machine thereon by positioning the outsole attaching extension of the welt for engagement by three grippers, one at the toe end of the upper and the other two at opposite sides of the forepart. In Fig. 2, a prewelted upper 54 mounted on a last supported on the jack is shown with the last advanced and the outsole attaching extension 56 of the welt positioned between the jaws of the grippers. The general organization of the grippers is illustrated in Fig. 1, the toe gripper being identified by the numeral 58 and the side grippers by numerals 60 and 62. After the welt at the forepart of the upper has been gripped by the grippers 58, 60 and 62, the toe end of the last is positioned against a T plate 64 (Fig. 16) to locate the last lengthwise thereof or the beginning of the lengthwise tensioning of the upper. This lengthwise tensioning of the upper opens up the bottom of the upper for the reception of the last. It may or may not stretch the upper, depending on whether the upper is scant or full. It will be understood that the rearward movement of the last whereby the tensioning of the upper is effected also serves to position the forepart of the last for its downward movement into the forepart of the upper. Referring now to Fig. 4, a disk 65 on a shaft 68 has a cam groove 66 in which is mounted a roll 67 on a bell crank lever 70 mounted on a cross shaft 72. At the end of its arm 74 the bell crank lever 70 carries a swivel block 76 through which extends a stem 78 extending downwardly from a rod 80. To effect the lengthwise tensioning of the upper the bell crank lever swings in a counterclockwise direction as seen in Fig. 4, causing the swivel block to operate against an enlarged portion 82 on the rod 80, moving the rod upwardly and thereby imparting clockwise swinging movement to two arms 84 mounted on the shaft 42 and provided with gripping members for connecting said arms to an arcuate member 86 T-shaped in cross section secured to a segmental extension 88 of the base of the jack 34. Referring to Fig. 1, the T-shaped member 86 is so positioned that in conjunction with the arcuate end faces of the extension 88 of the jack it provides two arcuate grooves 90 in which are mounted arcuate flanges 92 extending inwardly from the arms 84 and arranged to slide against the outer walls 94 of the grooves 90. The flanges 92 take the thrust against the T-shaped member 86 of gripping members or dogs 96 and 98 (Fig. 4) carried between the arms 84. When the machine is at rest the parts are in the position illustrated in Fig. 4 with the dogs 96 and 98 disengaged from the member 86 and the jack at the limit of its clockwise or outward movement, in which position it is located by the engagement of a cross plate 100 secured to the lower end of the member 86 with the lower edge faces of the arms 84, said arms in turn being located against a fixed crosshead 102 and yieldingly held against upward or clockwise movement by two torsion springs 104 (Figs. 3 and 8) mounted on a stud 106 secured to an upward extension 108 of the base of the machine head. The forward ends 112 (Fig. 4) of the springs 104 are connected by links 110 to the arms 84 while the rear end portions 114 bear against the upward extensions 40 of the base of the head. When the machine is at rest the arms 84 are disconnected from the jack and the jack is free to swing forwardly or in a counterclockwise direction on the shaft 42 to advance the toe end of the shoe into a position in which the welt at the toe end of the upper is located in correct relation to the toe gripper 58 as shown in Fig. 16. It will be understood that the position of the jack after the upper has been so located is variable, depending upon the size of the upper, but the operation of the cam 66 swings the jack to the same extent regardless of the position in which it is located after the upper has been positioned relatively to the grippers. Referring now to the construction and operation of the dogs which connect the arms 84 to the jack, the upper dog 96 is pivotally mounted on a crosspin 116 in the arms 84 and carries at its outer end a crosspin 118 the outer ends of which move in slots 120 provided in the arms 84. Pivotally mounted on the crosspin 118 within the bifurcated end of the dog 96 is the head 122 of the rod 80 (Fig. 5). During the first stage of the counterclockwise movement of the bell crank lever 70 the rod 80 moves upwardly, swinging the dog 96 in a clockwise direction and bringing its arcuate end face 124 (Fig. 4) into gripping or wedging engagement with the T-shaped member 86. During the remainder of the counterclockwise movement of the bell crank lever 70 the jack is swung outwardly or in a clockwise direction, as seen in Fig. 4, to a predetermined extent to tension the upper lengthwise thereof to admit the last. The upper is held under tension while the forepart of the last is forced downwardly into the forepart of the upper, whereupon the cam 66 operates to swing the bell crank lever 70 in a clockwise direction as seen in Fig. 4, disengaging the dog 96 from the T-shaped member 86 and then swinging the arms 84 downwardly. During their downward movement the arms 84 operate through the lower dog 98 to swing the jack inwardly, said dog having been brought into gripping engagement with the T-shaped member 86 during the intial or counterclockwise movement of the bell crank lever 70 by a spring 126 one end of which is anchored to one of the upward extensions 40 of the base of the head and the opposite end of which engages a pin 128 (Fig. 7) at the free end of an arm 130 pivoted on a shaft 132 mounted in upward extensions of the base of the head. The arm 130 carries a roll 134 which operates against a downwardly extending tail 136 of the dog 98 to cause the dog to grip the jack. The operation of the dog 98 is timed and controlled by a bell crank lever 140 mounted on the shaft 132 and connected by a link 142 to the bell crank lever 70, and provided with a roll 144 which operates against the tail of the dog. The inward movement of the jack forces the toe end of the last against the toe end of the upper while forepart embracing plates hereinafter described serve as an abutment for the toe end of the upper. In swinging the jack inwardly the bell crank lever 70 operates against a spring 138 surrounding the stem 78 of the rods 80, and after the last has been brought firmly into engagement with the inner surface of the toe end of the upper further clockwise movement of the bell crank lever 70 merely compresses the spring 138, thus obviating possible damage to the upper. The forward pressure thus exerted on the last is maintained during the subsequent operations of the machine, and during the latter part of the machine cycle after the insole attaching flange of the welt has been wiped over the margin of the insole and cement attached thereto, the bell crank lever 70 is further swung in a clockwise direction, as seen in Fig. 4, to return it to its rest position. During this final clockwise movement of the bell crank lever the dog 98 is disengaged from the T-shaped member 86 by the operation of the bell crank lever 140, leaving the jack free to swing outwardly to facilitate removal of the work. Upon disengagement of the dog 98 from the T-shaped member 86 the springs 104 return the arms 84 to their rest position and the spring 138 expands, thus returning the rod 80 to its rest position.

Figure 10:
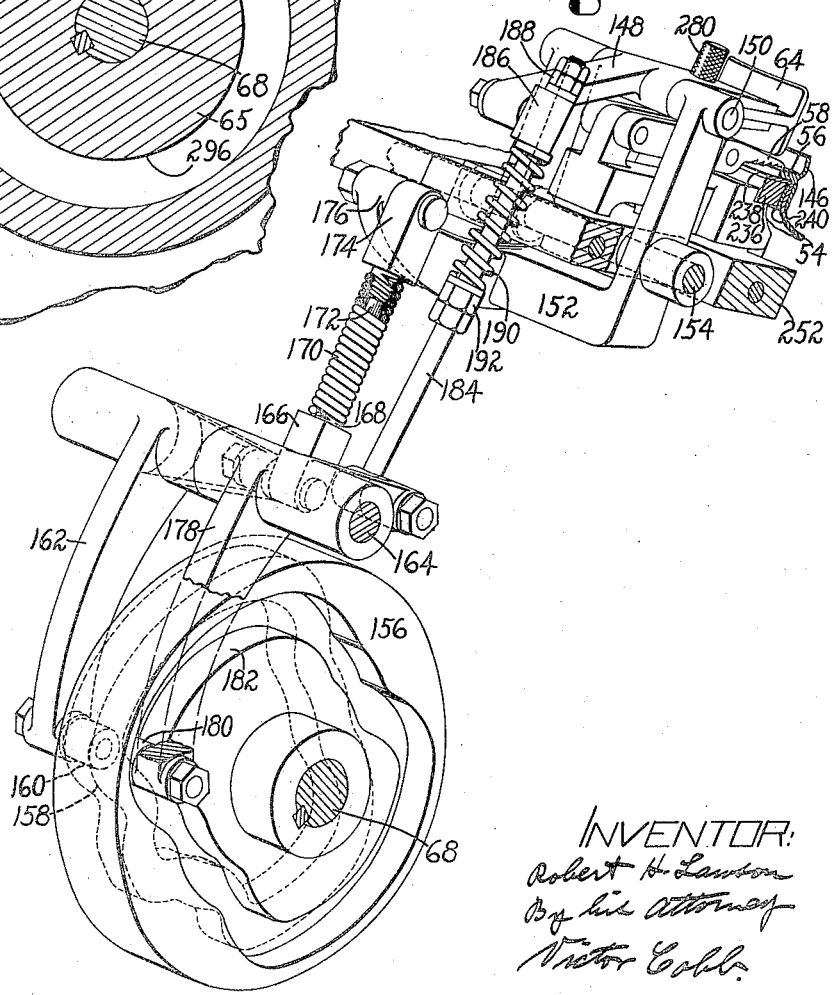
Fig. 10 is a perspective view partly in section illustrating the mechanism which operates on the toe end of the upper.
Figure 11:
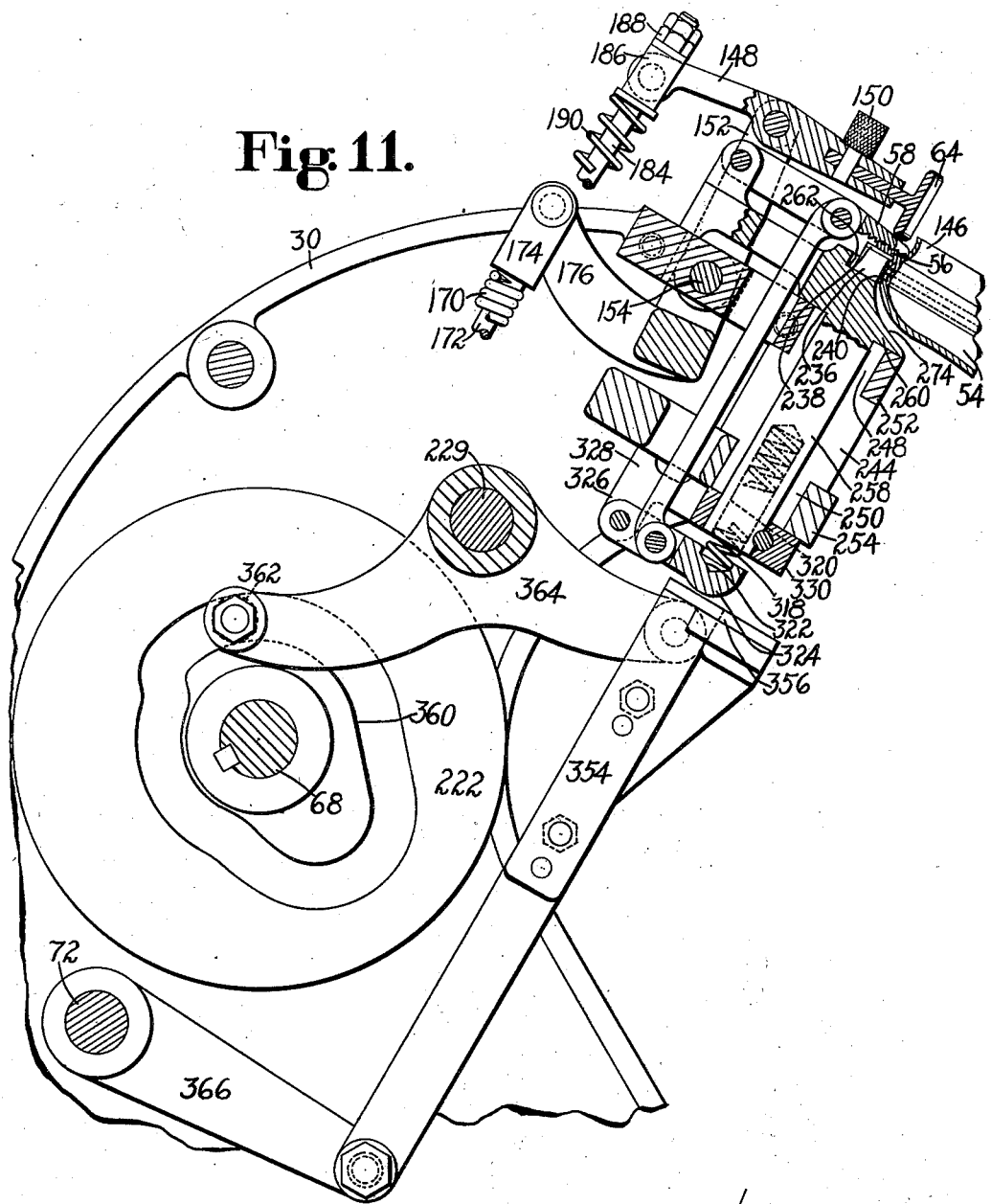
Fig. 11 is a sectional view taken substantially on the line XI—XI of Fig. 3.

Before the toe gripper 58 (Fig. 11) closes on the outsole attaching extension 56 of the welt the toe end of the upper is moved forwardly to position said outsole attaching extension relatively to the operating instrumentalities of the machine by the operation of the T-shaped plate 64. If the last is in the upper during this initial operation of the plate 64, its toe end must be swung upwardly by the operator before starting the machine to provide clearance for the operation of the plate. This will require no special attention on the part of the operator inasmuch as he will, for his own convenience, swing the toe end of the last up away from the toe end of the upper in order to make it easier for him to position the outsole-attaching extension of the welt relatively to the grippers. The prime purpose of the forward movement of the toe end of the upper by the plate 64 is to bring the toe end of the upper firmly against the forepart-embracing plates 236 and upper-indenting plates 238, hereinafter described, in order that the toe end of the upper will be correctly positioned for the succeeding operations of the machine and particularly in order that the toe end of the upper will be so positioned that the upper-indenting plates 238 will form an indentation or crease line in the welt at the apex of the angle formed between the outsole attaching extension 56 and the grain flap 240 secured to the upper. In locating the toe end of the upper relatively to the forepart-embracing plates and the upper-indenting plates, the plate 64 also positions the outsole-attaching extension 56 of the welt in the most desirable relation to the toe gripper 58. During the first stage of the machine cycle the plate 64 moves forwardly or to the right, as seen in Fig. 11, from its rest position, then downwardly into the toe end of the upper, then rearwardly or to the left, as seen in Fig. 11, to force the welt at the toe end of the upper into position for engagement by the toe gripper 58. The plate 64 holds the welt in this position while the toe gripper closes on the welt, then it moves upwardly out of the upper and into its position illustrated in Fig. 11. In this position it serves as a gage to locate the last lengthwise for the beginning of the upper tensioning operation as above described. After the forepart of the last has been forced downwardly into the forepart of the upper the member 64 again moves forwardly or to the right, as seen in Fig. 11, to wipe the insole attaching flange 146 of the welt inwardly over the margin of the insole. The T-shaped member 64 is mounted in the slotted end of a lever 148 and secured therein by a headed pin 150 which is removable to permit the member 64 to be withdrawn from the lever 148 and inverted and then replaced in said lever. The construction of the member 64 is such that in one position it is adapted to operate on a right foot shoe and after inversion from said position it is adapted to operate on a left foot shoe. The lever 148 is pivotally mounted midway between its ends between the upper ends of upwardly extending parallel arms of a bell crank lever 152 mounted on a cross shaft 154 at the upper end of the machine head. For moving the lever 148 bodily in the direction of the length of the upper a disk 156 (Fig. 10) on the cam shaft 68 has formed in one side a cam groove 158 in which is mounted a roll 160 on a bell crank lever 162 mounted on a cross shaft 164. At its free end the bell crank lever 162 carries a swivel block 166 which has a threaded stud 168 extending upwardly therefrom. Threaded on the stud 168 is the lower end of a spring 170 the upper end of which is threaded onto a similar stud 172 extending downwardly from a swivel block 174 pivoted to the free end of the arm 176 of the bell crank lever 152. It will be seen that the spring 170 serves as a link connecting the bell crank lever 162 to the bell crank lever 152. During the first stage of the machine cycle the spring 170 is moved upwardly by the bell crank lever 162, swinging the bell crank lever 152 in a clockwise direction, as seen in Fig. 11, moving the T-shaped member 64 to the right into a position over the toe end of the bottom opening of the upper. The spring 170 is normally contracted, as shown in Fig. 10, to a point where adjacent coils of the spring are in contact with each other. Thus, during the upward movement of said spring, it serves as an unyielding link from the bell crank lever 162 to the bell crank lever 152. After the T-shaped member 64 has been brought into a position over the toe end of the bottom opening of the upper it is moved downwardly by mechanism hereinafter described, and thereafter the bell crank lever 162 operates to move the member 64 to the left, as seen in Fig. 11, in order to force the welt into position to be engaged by the toe gripper 58. This movement is effected by a downward movement or pull exerted on the spring 170 by the bell crank lever 162, the spring in this instance serving as a yielding connection between the two bell crank levers and obviating damage to the upper by the operation of the member 64. For imparting to the member 64 its movements heightwise of the upper a bell crank lever 178 (Fig. 10) is mounted on the cross shaft 164. This lever carries at its lower end a roll 180 which is mounted in a cam groove 182 in the disk 156. Pivoted to the free end of the bell crank lever 178 is a rod 184 the upper portion of which is slidably mounted in a swivel block 186 pivoted on the lever 148. At its upper end the rod 184 carries a nut 188 which bears against the swivel block as the rod 184 is moved downwardly by the operation of the bell crank lever 178 to lift the member 64 out of the upper. During the forward movement of the member 64 to wipe the insole attaching flange 146 of the welt in over the margin of the insole the member 64 is yieldingly moved downwardly to press the flange 146 against the insole by the operation of the bell crank lever 178, the yielding action of the member 64 on the flange 146 being afforded by a spring 190 surrounding the rod 184 and confined between the swivel block 186 and a nut 192 on said rod.

Figure 12:
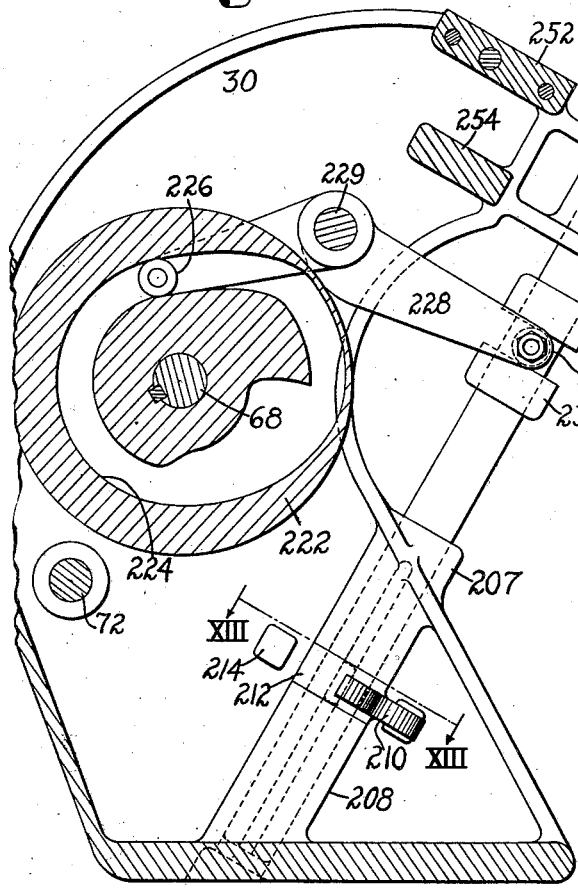
Fig. 12 is a sectional view taken substantially on the line XII—XII of Fig. 3.
Figure 13:
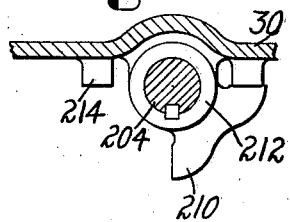
Fig. 13 is a sectional view taken on the line XIII—XIII of Fig. 12.

For forcing the forepart of a last into the forepart of an upper in the machine while the outsole attaching extension of the welt is held by the grippers 58, 60 and 62, the illustrated machine is provided with a presser foot 194 (Figs. 1 and 12). The presser foot 194 is removably secured to the lower end of a rod 196 and is invertible to adapt it for operation on both right and left foot lasts. Both the top and bottom of the presser foot are provided with insole engaging flanges 198 which are contoured to engage the forepart of the insole. During the first stage of the downward movement of the presser foot it levels or orients the forepart of the insole on the last bottom so that the insole will be correctly positioned relatively to the operating instrumentalities of the machine after the presser foot has completed its downward movement and forced the last into the forepart of the supported upper. The rod 196 which carries the presser foot is secured by a split clamp 200 to the free end of an arm 202 which is secured to the upper portion of a shaft 204 mounted for sliding and turning movement in bearings 206, 207 and 208 (Fig. 12). The presser foot 194 is so positioned relatively to the arm 202 that when the arm is swung from its rest position illustrated in Fig. 1 inwardly over the forepart of a last in the machine the bottom flange 198 of the presser foot is spaced uniformly from the edge of the insole. The operative position of the presser foot lengthwise of the last is determined by a finger 210 (Figs. 12 and 13) on a collar 212 splined on the shaft 204 and confined between the bearings 207 and 208 and a stop 214 which the finger engages to arrest the swinging movement of the arm 202. The presser foot is yieldingly held in its retracted position and at the limit of its upward movement, as illustrated in Fig. 1, by a spring 216 surrounding the upper portion of the shaft 204 and confined between the hub of the arm 202 and the bearing 206. The spring 216 operates by its expansion to move the presser foot upwardly from its operative position and it operates as a torsion spring to swing the presser foot outwardly into its retracted position. To this end the upper end of the spring is arranged for engagement with a pin 218 (Fig. 12) on the hub of the arm 202 and the lower end of the spring is arranged for engagement with a pin 220 on the bearing 206. The presser foot is manually swung from its retracted position in Fig. 1 into position to operate on the forepart of the last. For moving the presser foot downwardly to force the forepart of the last into the supported upper there is provided on the cam shaft 68 a disk 222 (Fig. 12) having in one side a cam groove 224 which receives a roll 226 at one end of a bell crank lever 228 mounted on a cross shaft 229. At its opposite end the lever 228 carries a roll 230 which is positioned between collars 232 and 234 secured to the shaft 204.

Figure 9:
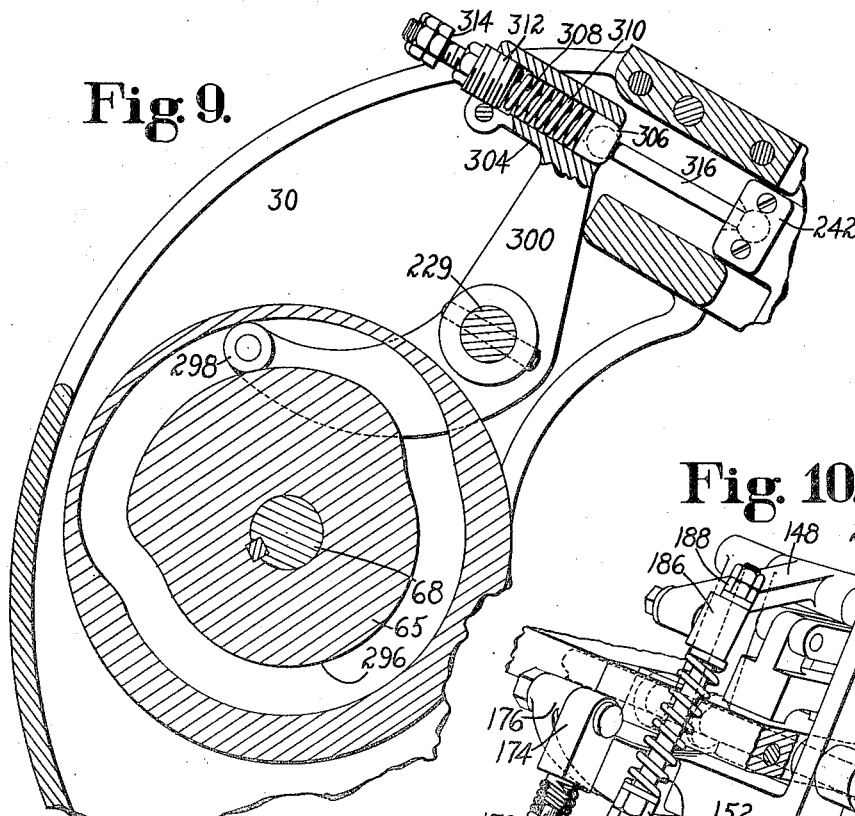
Fig. 9 is a sectional view taken substantially on the line IX—IX of Fig. 2.
Figure 22:
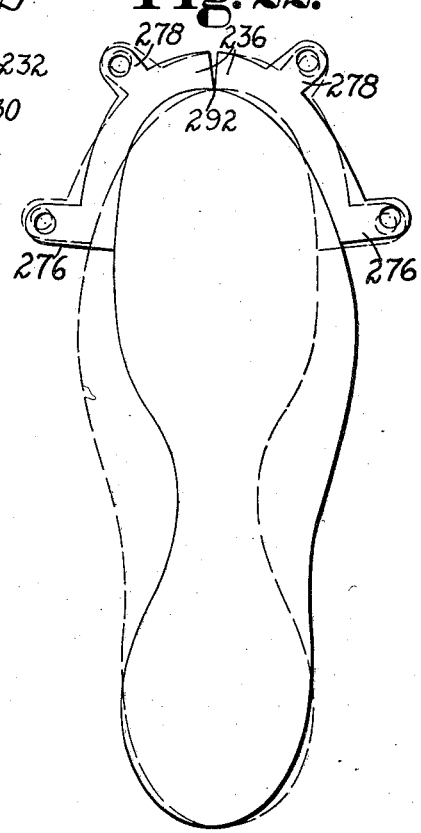
Fig. 22 is a plan view illustrating an inverted left foot last in its relation to the forepart embracing plates when said plates are in upper embracing position on the last, the corresponding position of a right foot last relatively to said upper embracing plates being shown in broken lines.
Figure 14:
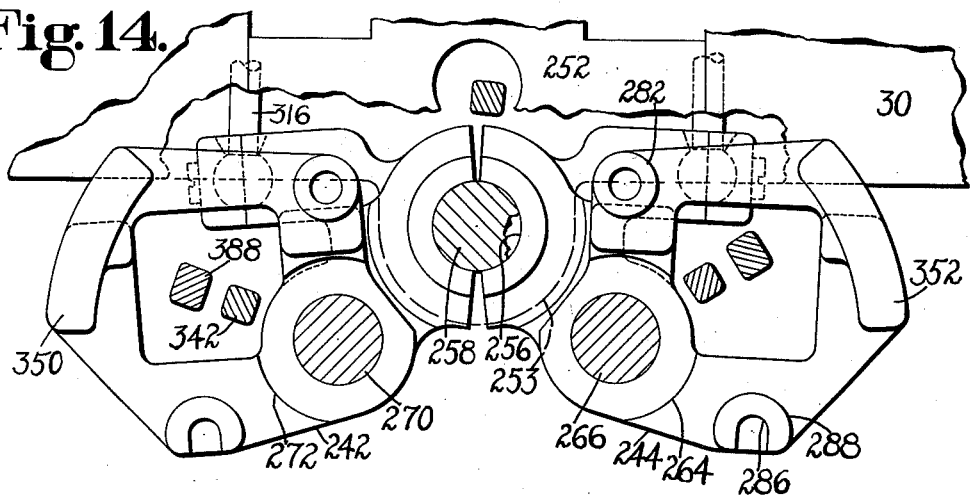
Fig. 14 is a sectional view taken substantially on the line XIV—XIV of Fig. 1.
Figure 15:
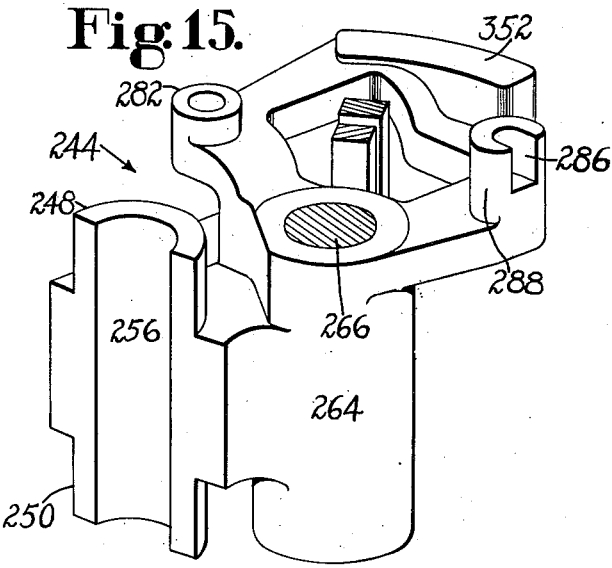
Fig. 15 is a perspective view illustrating a carrier member on which certain operating parts on the right side of the machine are mounted.

For embracing the welted margin of the forepart of the upper adjacent to the outsole attaching extension 56 of the welt and bringing it firmly into engagement with the periphery of the last and the edge face of an insole on the last bottom the illustrated machine is provided with forepart embracing plates 236 (Fig. 1) having upper engaging edge faces which are shaped to the periphery of the forepart of the last. Mounted on the forepart embracing plates 236 are upper-indenting plates 238 the work engaging edges of which have the same shape as the work engaging edge faces of the plates 236. The upper-indenting plates are spaced inwardly from the edge faces of the plates 236 (Fig. 11) for engagement with the welt at the apex of the angle defined by the outsole-attaching extension 56 and the outer or grain flap 240 secured to the upper. The indenting plates 238 form a well-defined welt crease in the upper and improve the appearance of the shoe. The forepart embracing plates 236 and the indenting plates 238, together with the toe gripper 58, the side grippers 60 and 62 and parts of their operating mechanism are mounted in carriers 242 and 244 (Fig. 14). The carrier 244 is illustrated in detail in Fig. 15. The construction and arrangement of the carrier 242 will be understood from the following description of the carrier 244. This carrier is provided with arcuate bearing members 248 and 250 which extend, respectively, upwardly and downwardly from the body portion of the carrier. Referring to Fig. 11, the arcuate bearing member 248, together with a corresponding bearing member of the carrier 242, are mounted to swivel in a bearing provided in a plate 252 secured to the top of the machine head 30, and the lower bearing member 250, together with a corresponding bearing member in the carrier 242, are mounted in a similar bearing in a crosshead 254. The body portions of the carriers 242 and 244 are confined between the plate 252 and the crosshead 254 to hold the carriers against movement heightwise thereof. A half-round groove 256 (Fig. 15) extends heightwise of the carrier 244 and is arranged in concentric relation to the bearing members 248 and 250. This groove and a corresponding groove in the carrier 242 provide a bearing for a shaft 258 (Fig. 11) having at its upper end a head 260 which is rabbeted at 262 to provide a seat for the forepart embracing plates 236. The carrier 244 is also provided with a bearing 264 (Fig. 15) for a shaft 266 corresponding to the shaft 258 and provided with a similar head 268 (Fig. 1). A like shaft 270 (Fig. 14) is mounted in a similar bearing 272 in the carrier 242. The heads of the three shafts 258, 266 and 270 are recessed, as indicated, for example, at 274 in Fig. 11, to provide clearance for the forepart of the upper 54. The forepart embracing plate 236, together with the upper indenting plate 238 at the right of the machine, is held in place on the carrier 244 by a loose-headed pin 289 which extends through holes provided in outward extensions 278 of said plates (Figs. 2 and 22) and is seated in a bore in a boss 282 (Fig. 15) on the carrier 244. The forward portions of said plates are positioned by a pin 284 mounted in an extension 276 of the forward portion of the plate 236 and extending upwardly through a hole in a similar extension of the upper-indenting plate 238 and downwardly into a recess 286 (Fig. 15) in a boss 288 on an outward extension of the carrier 244. The recess 286 extends through the front wall of the boss to facilitate removal of the plate 236 from the machine. To adjust the machine for operation on upper of the opposite foot the pin 289 is withdrawn, as is also the corresponding pin 290 (Fig. 1) at the left of the machine, whereupon the plates 236 and 238 are moved toward the jack and out of the machine, the plates 238 removed from the forepart embracing plates 236, the forepart embracing plates inverted, the plates 238 mounted on the upper surfaces of the inverted forepart embracing plates, and the plates replaced in the machine and again secured by the pins 289 and 290. In Fig. 22 the position of the forepart embracing plates for operation on left foot uppers is shown in full lines and their position for operating on right foot uppers is shown in broken lines. In closing on the forepart of the upper the plates 236 swing about a center common to the adjacent ends 292 of the upper engaging edge faces of the plates 236, the ends of said edge faces being directly above the center of the shaft 258 (Fig. 14). It will be understood that the center about which the plates 236 turn is a fixed center and the plates 236 have no bodily movement lengthwise of the upper. The plates 236 are closed on the upper by swinging movement of the carriers 242 and 244 toward each other by mechanism now to be described. Referring to Fig. 9, the disk 65 on the shaft 68 has a cam groove 296 in which is mounted a roll 298 at the lower end of a bell-crank lever 300 which is secured to the shaft 229. The lever 300 operates the carrier 242 (Fig. 2). For operating the carrier 244 there is secured to the shaft 229 a lever 302 which is substantially the same in its construction and operation as that part of the lever 300 extending upwardly from the shaft 229. Referring to Fig. 9, the lever 300 is provided at its upper end with a head 304 which is bored to receive a head 306 of a pin 308. The pin is surrounded by a spring 310 confined between the head 306 and a threaded plug 312, the plug being bored to permit the pin to slide through it. A similar threaded plug 414 (Fig. 2) is provided in the head 416 of the lever 302 which operates the carrier 244. A nut 314 at the outer end of the pin 308 limits the advancement of the pin by the spring 310 and prevents the head of the pin from moving out of the bore in the lever 300. Mounted in the head 306 of the pin is the ball end of a link 316 the opposite end of which has a ball and socket connection to the carrier 242. The rest position of the carrier is determined by the position of the plug 312 in the bore in the head of the lever 300 and it will be seen that the plug may be adjusted to vary the rest position of the carrier. The connections from the lever 302 to the carrier 244 are similar to the connections from the lever 300 to the carrier 242 and will be understood from the above description.

For closing the toe gripper 58 on the outsole attaching extension 56 of the welt a spring 318 (Fig. 11) is mounted in a bore 320 extending upwardly into the lower portion of the shaft 258, the lower end of the spring being seated in a recess 322 in a short lever 324 pivoted to a lug 326 extending downwardly from an extension 328 of a collar 330 secured to the shaft 258. Similarly, the left side gripper 60 (Fig. 19) is operated by a spring 332 mounted in a bore 334 extending upwardly into the lower portion of the shaft 270 and arranged to engage a short lever 336 which is pivoted on a pin 338 in a lug 339 on an extension of a collar 340 secured to the shaft 270. For operating the right side gripper 62 (Fig. 1) there are provided a spring and lever (not shown) similar to the spring and lever which operate the left side gripper 60. The organizations of the three gripper assemblies are substantially alike and will be understood from the following description of the organization of the left side gripper assembly illustrated in Fig. 19. The short lever 336 is connected to the gripper by a link 342 which extends upwardly from the lever through suitable openings in the collar 340 and the carrier 242. For mounting the gripper 60 the head of the shaft 270 has an extension 344 which has an upwardly extending lug 346 to which the arm of the gripper is pivoted. Thus it will be seen that the gripper 60 and the lever 336 swing in unison during turning movement of the shaft 270 to adjust the gripper to the work and to locate it so that its longitudinal center line is perpendicular to the work-engaging edge face of the upper-embracing plate 236. This adjustment of the gripper occurs after inversion of the upper-embracing plates, as hereinbefore described, and also after replacement of said plates by plates of different size or style. The adjustment is effected automatically by the engagement of the left plate in the rabbeted head of the shaft 270. For supporting the extension 344 of the head of the shaft 270 the carrier 242 has a rail 350 on which said extension is slidably mounted. See also the rail 352 of the carrier 244 illustrated in Fig. 15. When the machine is at rest the grippers are held open against the pressure of their operating springs by an actuator 354 (Fig. 1) having at its upper end a table 356 which acts on the gripper-operating levers 324, 336 and 358. The closing of the grippers is timed and controlled by downward movement of the actuator 354 while the opening of the grippers is effected by the upward or return movement of the actuator. For operating the actuator the disk 222 (Fig. 11) on the cam shaft 68 is provided with a cam groove 360 in which operates a roll 362 carried by a bent lever 364 mounted on the shaft 229 and pivoted to the actuator 354 just beneath the table 356. At its lower end the actuator is pivoted to the free end of an arm 366 on the shaft 72, which arm maintains the required alinement of the actuator.

Figure 19:
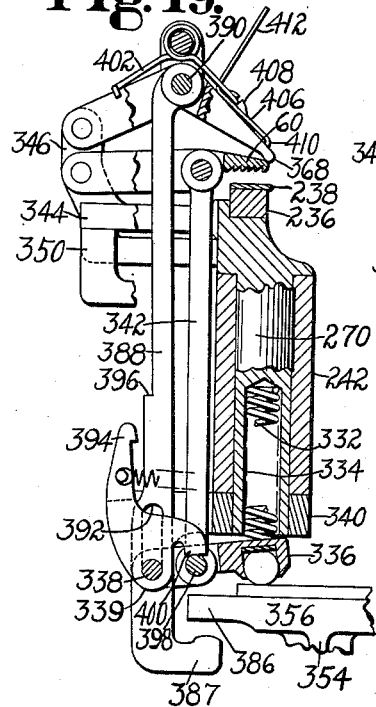
Figs. 19, 20 and 21 are detail views partly in section illustrating the mechanism which operates on the left side of the forepart at different stages in the operation of the machine.
Figure 21:
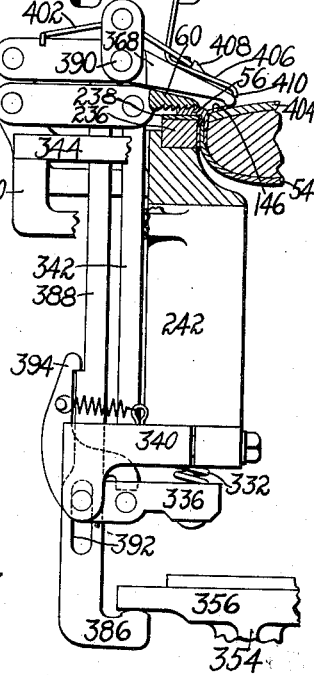
Figure 23:
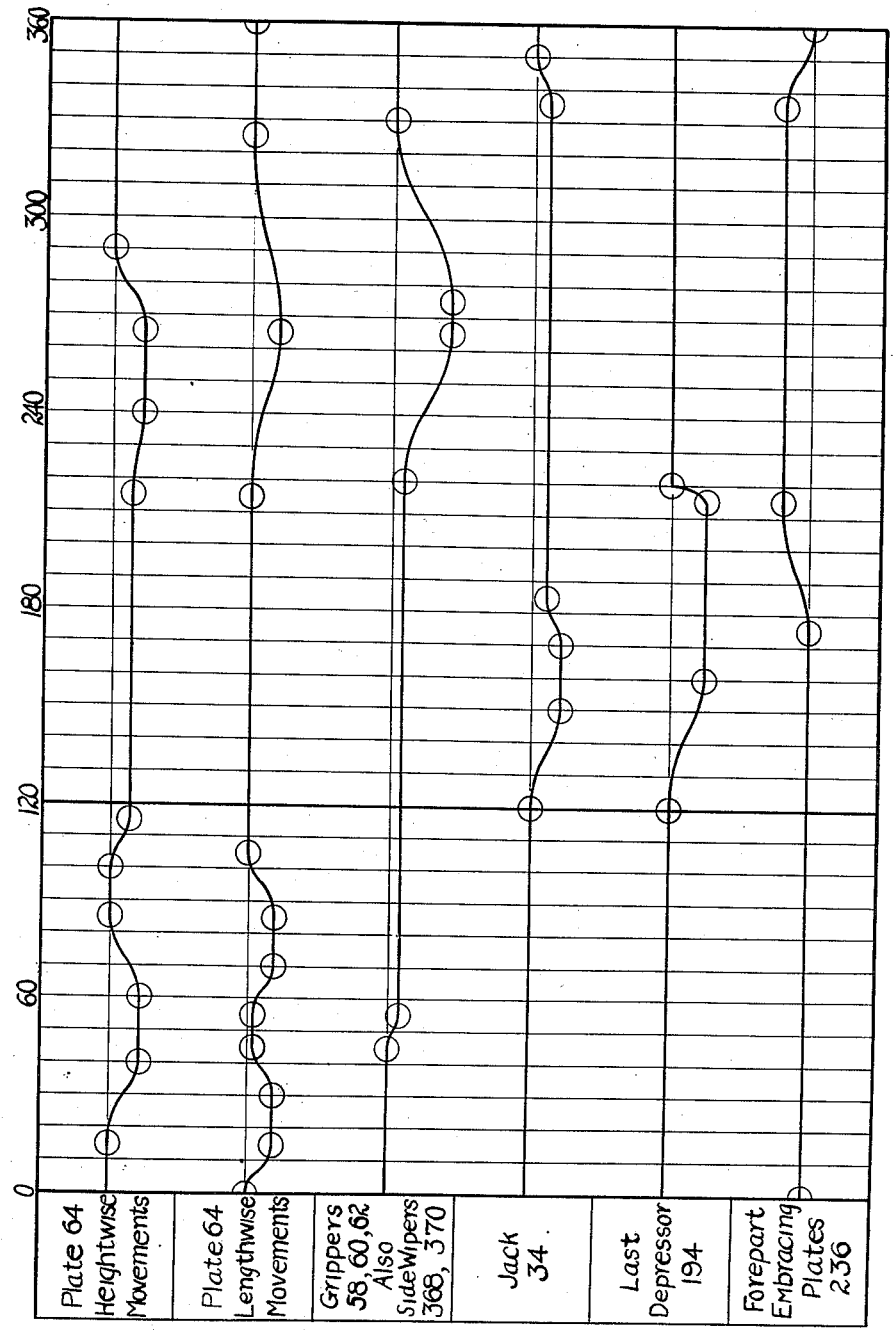
Fig. 23 is a cam chart.

For wiping the insole attaching extension of the welt inwardly over the opposite side margins of the forepart of the insole the machine is provided with wiper plates 368 and 370 (Fig. 1) which are substantially alike in their construction and operation. The construction and operation of the wiper plates will now be described with reference to the wiper plate 370, as shown in Fig. 1. The plate 370 tapers toward its wiping edge which is slightly concave to agree with the curvature of the periphery of the forepart of a shoe and has a downwardly extending wiping lip. At its thick end the wiper plate has ears 372 through which extends a pin 374. Mounted on the pin between the ears 372 are two parallel arms 376 which are pivoted at their outer ends to a lug 378 on an extension of the shaft head 263. The wiper plate is held in its retracted position shown in Fig. 1 by two torsion springs 380 on a pin 382 mounted in plates 384 on the pin 374. The end portions of the springs 380 are extended for engagement with the wiper plate 370 and the arms 376 respectively, against which they exert a downward pressure which, in the case of the wiper plate, is taken by the gripper 62. The wiper plate 370 is advanced by downward movement of the pivotally connected ends of the plate 370 and the arms 376 by mechanism hereinafter described. During such downward movement the plate and the arms are straightened, causing the wiping edge of the plate to advance and perform its function. As the plate advances the springs 380 maintain a downward pressure against it, causing it to apply pressure to the insole attaching extension of the welt sufficient to cause the cement-treated surfaces of the welt and insole to adhere, see Fig. 21. The operation of the wiper plates will now be described with reference to Fig. 19 illustrating the assembly at the left of the machine. The wiper plates are operated simultaneously by a downward movement of the actuator 354 subsequent to the closing of the grippers on the outsole attaching extension of the welt. For operating the wiper plate 368 the table 356 of the actuator has a lateral extension 386 which engages an extension 387 of a vertical bar 388 pivoted at its upper end on a pin 390 on the plate 368 and provided near its lower end with a slot 392 through which extends the pin 338 on which is pivoted the lever 336. Also pivoted on the pin 338 is a latch 394 which engages a shoulder 396 on the bar 388 as the wiper plate comes to the limit of its advancement (Fig. 21) and prevents return movement of the wiper plate. The latch remains in engagement with the shoulder 396 while the actuator 354 lifts the gripper 60 off the welt and causes the gripper to lift the wiper 368 off the welt. The return movement of the wiper occurs after it has been elevated by the gripper 60 sufficiently to prevent engagement of the work by the wiper as it is retracted. The return movement of the wiper occurs near the end of the machine cycle immediately after a pin 398 on the lever 336 engages extensions of the latch 394, one of which is shown at 400 in Fig. 19, and disengages the latch from the shoulder 396 on the bar 388, thus permitting torsion springs 402 to retract the wiper plate.

Figure 20:
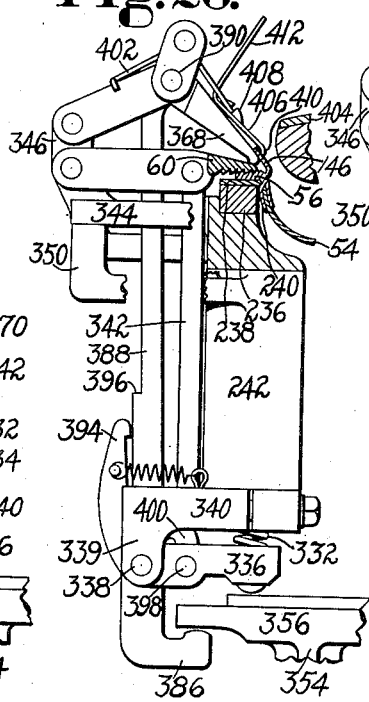

During the downward movement of the last the insole attaching extension 146 of the welt at the sides of the forepart of the upper must be held back away from the last as seen in Fig. 16 so that the last as it moves downwardly will not dislocate it. The operator can, if he desires, hold the insole attaching extension away from the last with his fingers, but this is a difficult and tedious task and for that reason the two side wipers are preferably provided with gripper plates for holding said extension. One of these plates is shown at 406 in Fig. 19. This plate is L-shaped and has on one of its arms a grooved boss 408 in which is mounted an inturned end of each spring 402. It will be seen that the bend in the plate 406 acts as a fulcrum point for the plate and the springs 402 acting at the location of the groove in the boss 408 tend to hold a lip 410 on the plate 406 against the wiper plate 368. The upwardly extending portion 412 of the plate 406 serves as a handle whereby the work engaging portion of the plate is lifted to admit the insole attaching extension 146 of the welt (Fig. 20).

In the operation of the machine an upper which may or may not have been assembled on a last is positioned with the outsole attaching extension of its welt on the upper indenting plates 238 ready for the operation of the grippers 58, 60 and 62. The operator then depresses a clutch treadle (not shown) to start the machine and the toe positioning plate 64 (Fig. 1) enters the toe end of the upper, presses the upper against the upper embracing plates 236 and holds it there while the grippers close on the welt. Then the plate 64 moves upwardly out of the upper and into its last-gaging position (Fig. 16). At this point the machine stops to permit the operator to insert a last into the rear part of the upper and mount it on the last pin 36 (if the upper was not previously assembled on its last) and to swing the last depressor 194 into position to act on the forepart of the last. The last carries an insole 404 (Fig. 16) the margin of which has been treated with cement for attachment thereto of the insole attaching extension 146 of the welt which has also been treated with cement. After the toe end of the last has been positioned against the last-gaging plate 64 as shown in Fig. 16 the operator again depresses the clutch treadle and immediately the last depressor moves downwardly to force the forepart of the last into the upper. During the first stage of the downward movement of the last depressor and before the last enters the upper the jack 34 (Fig. 4) is operated to tension the upper lengthwise thereof in order to facilitate the entrance of the forepart of the last into the upper. The upper is held under lengthwise tension by the jack until the depressor has completed its downward movement and then the jack is moved in a direction to advance the toe end of the last into the toe end of the upper and to press the toe end of the upper firmly against the upper embracing plates 236.

During the movement of the last depressor the upper at opposite sides of the forepart is held by the side grippers 60 and 62 and the action of the last depressor in forcing the forepart of the last into the upper serves to tension the forepart of the upper widthwise thereof and shape it to the last. The distance between the side grippers may be adjusted to provide the proper clearance for the forepart of the last by adjustive movement of one or both of the gripper carriers 242 and 244. Referring to Fig. 9, such adjustment of the carrier 242 is effected by turning the threaded plug 312 in the carrier-operating cam lever 300. The last depressor remains at the limit of its downward movement until after the upper embracing plates 236 have closed, as shown in Fig. 22, and gripped the forepart of the upper against the last. This occurs immediately after the reverse movement of the jack. After the upper embracing plates have closed on the upper and the last depressor has been retracted the plate 64 (Fig. 1) which wipes in the toe end of the insole-attaching extension of the welt advances to perform said function while at the same time the wipers 368 and 370 advance (Fig. 21) to wipe in those portions of said extension at opposite sides of the forepart of the upper. As the wipers 368 and 370 advance the insole attaching extension is pulled out from under the gripper plates 406 on the wipers. The grippers and wipers are then retracted and the upper embracing plates are opened, permitting the shoe to be removed from the machine.

While the machine has been illustrated with reference to its operation on prewelted shoes, it is to be understood that the machine is capable of operating on other types of shoes. For example, it is adapted to operate on a stitchdown upper in which the lining at the forepart of the upper is wiped inwardly and cement attached to the margin of an insole.

Having thus described my invention, what I claim as new and desire to secure by Letters Patent of the United States is:

1. A machine for shaping uppers over lasts having, in combination, a gripper for engaging an outsole-attaching extension of an upper and holding the upper under tension, a member for forcing the bottom margin of the upper against a last and the edge face of an insole thereon, a wiper for wiping an insole-attaching extension of the upper in over the margin of the insole, and a carrier for said gripper, member and wiper movable to operate said member.

2. A machine for shaping uppers over lasts having, in combination, a gripper for engaging an outsole-attaching extension of an upper and holding the upper under tension, a member for forcing the bottom margin of the upper against a last and the edge face of an insole thereon, a wiper for wiping an insole-attaching extension of the upper in over the margin of the insole, a carrier for said gripper, member and wiper movable to operate said member, and means for causing the gripper to grip the outsole-attaching extension and to hold it during the operation of the member and the wiper.

3. A machine for shaping over lasts uppers having outsole-attaching extensions and insole-attaching extensions having, in combination, a member for acting on the margin of an end portion of an upper to cause it to engage closely a last mounted therein, a gripper constructed and arranged to act on the outsole-attaching extension of the upper, a wiper constructed and arranged to act on the insole-attaching extension, and a carrier for said member, gripper and wiper mounted for swinging movement to operate said member.

4. A machine for shaping uppers over lasts having, in combination, upper-embracing means for gripping an end portion of an upper against a last, wipers for wiping an insole-attaching extension of the upper in over the margin of an insole on the last bottom, and grippers constructed and arranged to engage an outsole-attaching extension of the upper and to hold it during the closing of the upper-embracing means on the upper and thereafter during the operation of the wipers.

5. A machine for shaping uppers over lasts having, in combination, a pair of upper-embracing members for gripping an end portion of an upper against a last, wipers for wiping an insole-attaching extension of the upper in over the margin of an insole on the last bottom, and grippers constructed and arranged to engage an outsole-attaching extension of the upper and to hold it during the closing of the upper embracing members on the upper and thereafter during the operation of the wipers.

6. A machine for shaping uppers over lasts having, in combination, a depressor for forcing the forepart of a last into the forepart of an upper, upper-embracing means for gripping the forepart of the upper against the last, wipers for wiping an insole-attaching extension of the upper in over the margin of an insole on the last bottom, and grippers constructed and arranged to engage an outsole-attaching extension of the upper and hold it during the operation of the depressor, the upper-embracing means and the wipers.

7. A machine for shaping uppers over lasts having, in combination, a pair of upper-embracing members constructed and arranged to grip an end portion of an upper against a last, carriers for said upper-embracing members, grippers carried by said carriers and constructed and arranged to operate on an outsole-attaching extension of the upper, and wipers carried by said carriers and constructed and arranged to wipe an insole-attaching extension of the upper inwardly over the margin of an insole on the last bottom.

8. A machine for shaping uppers over lasts having, in combination, a depressor for forcing the forepart of a last into an upper, grippers constructed and arranged to engage an outsole-attaching extension of the forepart of the upper and hold it during the depression of the last into the upper, forepart-embracing members for forcing the bottom margin of the forepart of the upper against the last and the edge face of an insole thereon, wipers for wiping an insole-attaching extension of the upper in over the margin of the insole, and carriers for the grippers, members and wipers constructed and arranged for movement to operate said members.

9. A machine for shaping uppers over lasts having, in combination, a pair of upper-embracing members, a plurality of grippers arranged to act on an outsole-attaching extension of an upper, wipers for wiping an insole-attaching extension of the upper in over opposite sides of the margin of the forepart of an insole, and a pair of carriers for the members, the grippers and the wipers mounted for swinging movement about a common axis adjacent to the toe end of a shoe in the machine.

10. A machine for shaping uppers over lasts having, in combination, a pair of upper-embracing members, a depressor for forcing the forepart of a last into the forepart of an upper, a plurality of grippers arranged to act on an outsole-attaching extension of the upper, wipers for wiping an insole-attaching extension of the upper in over opposite sides of the margin of the forepart of an insole on the last bottom, and a pair of carriers for the members, the grippers and the wipers mounted for swinging movement about a common axis adjacent to the toe end of a shoe in the machine.

11. In a machine for shaping uppers over lasts, a member for forcing an upper against a last exteriorly of the last bottom, and a member constructed and arranged to enter the upper and force the upper against the first-mentioned member before the last is forced into the upper and then to withdraw from the upper to admit the last.

12. In a machine for shaping uppers over lasts, a pair of end-embracing members for forcing an upper against a last exteriorly of the last bottom, and a member constructed and arranged to enter the upper and force the upper into engagement with said end-embracing members before the last is forced into the upper and then to withdraw from the upper to admit the last.

13. In a machine for shaping uppers over lasts, a gripper for engaging an outsole-attaching extension of an upper, a member for forcing the upper against a last exteriorly of the last bottom, and a member constructed and arranged to enter the upper and to move toward said first-mentioned member to press the upper against said first-mentioned member and to position the outsole-attaching extension for engagement by the gripper.

14. In a machine for shaping uppers over lasts, a gripper for operating on an outsole-attaching extension of an upper, a member for forcing the bottom portion of the upper against a last, and a presser member constructed and arranged to enter the upper and to move in a direction to force the upper against the first-mentioned member and to position the outsole-attaching extension of the upper relatively to the gripper, said presser member being movable out of the upper after the gripper has closed to permit the last to be forced into the upper.

15. In a machine for shaping uppers over lasts, a toe gripper for engaging an outsole-attaching extension of an upper, and a member constructed and arranged to enter the interior of the toe portion of the upper and to move toward the gripper to position said outsole-attaching extension relatively to the gripper.

16. In a machine for shaping uppers over lasts, a toe gripper for engaging an outsole-attaching extension of an upper, a member constructed and arranged to enter the interior of the toe portion of the upper and to move toward the gripper to position said outsole-attaching extension relatively to the gripper, said member comprising an arm having upward and downward extensions for operating on right foot and left foot uppers respectively, and a holder in which said member is invertibly mounted.

17. In a machine for shaping uppers over lasts, a toe gripper for engaging an outsole-attaching extension of an upper, and a member constructed and arranged to enter the interior of the toe portion of the upper and to move toward the gripper to position said outsole-attaching extension relatively to the gripper and thereafter, after a last having an insole thereon has been located in the forepart of the upper, to wipe an insole-attaching extension of the upper in over the margin of the insole.

18. In a machine for shaping uppers over lasts, a toe gripper for engaging an outsole-attaching extension of an upper, a member constructed and arranged to enter the interior of the toe portion of the upper and to move toward the gripper to position said outsole-attaching extension relatively to the gripper, a lever on which said member is mounted, said lever being movable to impart to said member movements generally heightwise of the upper, and a carrier for said lever movable to advance said member toward the gripper.

19. In a machine for shaping uppers over lasts, a toe positioning member, means for moving said member heightwise of an upper in the machine into and out of the toe end of the upper, and means for moving said member lengthwise of the upper, first to position the toe end of the upper relatively to operating instrumentalities of the machine, and thereafter, after said member has been moved heightwise of the upper out of the upper and after a last with an insole thereon has been forced into the forepart of the upper, to wipe an insole-attaching extension of the upper in over the margin of the insole on the last bottom.

20. In a machine for shaping uppers over lasts, a toe positioning member, means for moving said member heightwise of an upper in the machine into and out of the toe end of the upper, and means for moving said member lengthwise of the upper, first to position the toe end of the upper relatively to operating instrumentalities of the machine, then after said member has been moved heightwise of the upper out of the upper, to position said member to serve as a gage for the toe end of a last to position the last preparatory to its movement into the upper, and finally after the last has been forced into the upper to wipe an insole-attaching extension of the upper in over the margin of an insole on the last bottom.

21. In a machine for shaping uppers over lasts, a toe positioning member, a lever for moving said member heightwise of an upper in the machine into and out of the toe end of the upper, and a carrier for said lever for moving said member lengthwise of the upper, first to position the toe end of the upper relatively to operating instrumentalities of the machine, then after said member has been moved heightwise of the upper out of the upper, to position said member to serve as a gage for the toe end of a last to position the last preparatory to its movement into the upper, and finally after the last has been forced into the upper to wipe an insole-attaching extension of the upper in over the margin of an insole on the last bottom.

22. In a machine for shaping pre-welted uppers over lasts, a toe gripper for engaging an outsole attaching extension of the welt, side grippers for engaging said extension at opposite sides of the forepart of the upper, a member constructed and arranged to enter the interior of the toe portion of the upper and to move toward the toe gripper to position said outsole attaching extension relatively to the gripper, and a wiper for wiping an insole attaching extension of the welt inwardly over the margin of an insole on a last bottom.

23. In a machine for shaping pre-welted uppers over lasts, a toe gripper for engaging an outsole attaching extension of the welt, side grippers for engaging said extension at opposite sides of the forepart of the upper, a member constructed and arranged to enter the interior of the toe portion of the upper and to move toward the toe gripper to position said outsole attaching extension relatively to the gripper, a wiper for wiping an insole attaching extension of the welt inwardly over the margin of an insole on a last bottom, and carrying means to which the wiper is pivoted, said carrying means being mounted for swinging movement heightwise of an upper in the machine about an axis which is fixed during the operation of the wiper.

24. In a machine for shaping uppers over lasts, a wiper assembly comprising a wiper and carrying means therefor operable to advance and retract the wiper, and a member on which the wiper assembly is mounted for swinging movement about an axis extending heightwise of the shoe to orient the wiper relatively to the work preparatory to the operation of the machine on a run of shoes, said member being movable about another axis extending heightwise of the shoe to position the wiper assembly in determinate relation to the work for the beginning of the wiping operation.

25. In a machine for shaping uppers over lasts, a wiper assembly comprising a wiper and carrying means for advancing and retracting the wiper, a holder for the wiper assembly, and a member on which said holder is pivoted for swinging movement about an axis extending heightwise of the shoe in a plane parallel to the last bottom to orient the wiper relatively to the work preparatory to the operation of the machine on a run of shoes, said member being movable about another axis extending heightwise of the shoe to position the wiper assembly in determinate relation to the work for the beginning of the wiping operation.

26. In a machine for shaping uppers over lasts, a wiper assembly comprising a wiper and carrying means therefor operable to advance and retract the wiper, and a member on which the wiper assembly is mounted for swinging movement to orient the wiper relatively to a shoe in the machine preparatory to the operation of the machine on a run of shoes, said member being movable into engagement with the periphery of the shoe in the course of the operation of the machine thereby to position the wiper assembly in determinate relation to the shoe for the beginning of the wiping operation.

27. In a machine for shaping uppers over lasts, a wiper for wiping an insole-attaching extension of an upper inwardly over the margin of an insole on a last bottom, and carrying means to which the wiper is pivoted, said carrying means being mounted for swinging movement heightwise of an upper in the machine about an axis which is fixed during the operation of the wiper.

28. In a machine for shaping uppers over lasts, a wiper for wiping an insole-attaching extension of an upper inwardly over the margin of an insole on a last bottom, carrying means to which the wiper is pivoted, said carrying means being mounted for swinging movement heightwise of an upper in the machine about an axis which is fixed during the operation of the wiper, and resilient means for retracting the wiper by swinging the carrying means reversely and simultaneously swinging the wiper about its pivotal connection with the carrying means.

29. In a machine for shaping uppers over lasts, a gripper and wiper assembly comprising a gripper constructed and arranged to operate on an outsole-attaching extension of an upper, a wiper and carrying means for the wiper operable to advance and retract the wiper, and a member on which said gripper and wiper assembly is mounted for swinging movement to orient the gripper and the wiper relatively to the work preparatory to the operation of the machine on a run of shoes, said member being movable to position said assembly in determinate relation to the work.

30. In a machine for shaping uppers over lasts, a gripper and wiper assembly comprising a gripper constructed and arranged to operate on an outsole-attaching extension of an upper, a wiper and carrying means for the wiper operable to advance and retract the wiper, a member on which said gripper and wiper assembly is mounted for swinging movement to orient the gripper and the wiper relatively to the work preparatory to the operation of the machine on a run of shoes, said member being movable to position said assembly in determinate relation to the work, and an actuator which controls the operation of the gripper and which operates after the gripper is closed on the work to operater the wiper.

31. In a machine for shaping uppers over lasts, a wiper for wiping an insole-attaching extension of an upper inwardly over the margin of an insole on a last bottom, and wiper-carrying means to which the wiper is pivoted, said carrying means being mounted for swinging movement about an axis which is fixed during the operation of the wiper, the wiper and its carrying means being arranged in angular relation to each other when the machine is at rest and in straightened relation to each other after the wiper has completed its wiping movement.

32. In a machine for shaping uppers over lasts, a wiper for wiping an insole-attaching extension of an upper inwardly over the margin of an insole on a last bottom, carrying means to which the wiper is pivoted, said carrying means being mounted for swinging movement heightwise of an upper in the machine about an axis which is fixed during the operation of the wiper, said wiper and its carrying means, when the wiper is retracted, being arranged in angular relation to each other and when the wiper is fully advanced being arranged in a substantially straight line, and resilient means constructed and arranged to operate on the wiper and the carrying means to hold the wiper yieldingly in its retracted position.

33. In a machine for shaping uppers over lasts, a wiper for wiping an insole-attaching extension of an upper inwardly over the margin of an insole on a last bottom, carrying means to which the wiper is pivoted, said carrying means being mounted for swinging movement heightwise of an upper in the machine about an axis which is fixed during the operation of the wiper, said wiper and its carrying means, when the wiper is retracted, being arranged in angular relation to each other and when the wiper is fully advanced being arranged in a substantially straight line, and a resilient member for retracting the wiper and for pressing the wiper downwardly against the insole-attaching extension of the upper during its advancement.

34. In a machine for shaping uppers over lasts, a wiper for wiping an insole-attaching extension of an upper inwardly over the margin of an insole on a last bottom, carrying means to which the wiper is pivoted, said carrying means being mounted for swinging movement heightwise of an upper in the machine about an axis which is fixed during the operation of the wiper, said wiper and its carrying means, when the wiper is retracted, being arranged in angular relation to each other and when the wiper is fully advanced being arranged in a substantially straight line, resilient means constructed and arranged to operate on the wiper and its carrying means to hold the wiper yieldingly in its retracted position, a wiper-operating member, an actuator for controlling the operation of said member, and means for controlling and timing the operation of said actuator.

35. In a machine for shaping uppers over lasts, a wiper for wiping an insole-attaching extension of an upper inwardly over the margin of an insole on a last bottom, wiper-carrying means mounted for swinging movement heightwise of the upper about an axis which is fixed during the operation of the wiper, and means on the wiper for holding said insole-attaching extension against the wiper.

36. In a machine for shaping uppers over lasts, a wiper for wiping an insole-attaching extension of an upper inwardly over the margin of an insole on a last bottom, wiper-carrying means mounted for swinging movement heightwise of the upper about an axis which is fixed during the operation of the wiper, a clamping member for holding said insole-attaching extension against the wiper, and means which operates during that portion of the machine cycle prior to the operation of the wiper to cause the clamping member to hold the insole-attaching extension yieldingly against the wiper, and operates after the wiper has performed its function to retract the wiper.

37. In a machine for shaping uppers over lasts, a gripper for holding an upper by an outsole-attaching extension thereof, a wiper for wiping an insole-attaching extension of the upper in over the margin of an insole on a last in the upper, pressure means for operating the gripper, a member for operating the wiper, an actuator for said member the operation of which releases the pressure means for operating the gripper, and means for controlling and timing the operation of said actuator.

38. In a machine for shaping uppers over lasts, a gripper for holding an upper by an outsole-attaching extension thereof, a wiper for wiping an insole-attaching extension of the upper in over the margin of an insole on a last in the upper, pressure means for operating the gripper, a member for operating the wiper, an actuator for said member the operation of which releases the pressure means for operating the gripper, means for controlling and timing the operation of said actuator, carrying means on which the wiper swings during its operation and retraction, said carrying means being mounted for swinging movement heightwise of the upper about an axis which is fixed during the operation of the machine, a latch for holding the wiper at the limit of its advancement while the gripper in its opening movement lifts the wiper away from the work, and means for tripping the latch after the wiper has been lifted sufficiently to retract without engaging the work.

39. In a machine for shaping over lasts uppers having outward outsole-attaching extensions and insole-attaching extensions, means for gripping an outsole-attaching extension of an upper, a wiper for working an insole-attaching extension inwardly over the margin of an insole on a last bottom, and means for automatically moving said wiper out of contact with said insole-attaching extension before the wiper is retracted.

40. In a machine for shaping over lasts uppers having outward outsole-attaching extensions and insole-attaching extensions, a plurality of grippers constructed and arranged to act on an outsole-attaching extension at opposite sides of an upper, a plurality of wipers constructed and arranged to act on an insole-attaching extension at opposite sides of the upper and to work said insole-attaching extension inwardly over the margin of an insole on a last bottom, and means for automatically moving said wipers out of contact with said insole-attaching extension before said wipers are retracted.

41. A machine for shaping uppers over lasts having in combination means for gripping the forepart of an upper mounted on a last, a jack for supporting the last and the upper thereon, said jack being movable in a direction to tension the upper lengthwise thereof, power-operated means, and connections from said power-operated means to the jack for moving the jack including a dog and a dog carrier on which the dog is arranged for gripping engagement with the jack.

42. A machine for shaping uppers over lasts having in combination means for gripping the forepart of an upper mounted on a last, a jack for supporting the last and the upper thereon, said jack being movable in a direction to tension the upper lengthwise thereof, power-operated means for moving the jack in a direction to tension the upper lengthwise thereof, and connections from the power-operated means to the jack including a dog, a carrier on which the dog is arranged for gripping engagement with the jack, and a member which operates on the dog to bring it into gripping engagement with the jack and thereafter operates to move the jack.

43. A machine for shaping uppers over lasts having in combination means for gripping the forepart of an upper mounted on a last, a jack for supporting the last and the upper thereon, said jack being movable in a direction to tension the upper lengthwise thereof, power-operated means for moving the jack in a direction to tension the upper lengthwise thereof, connections from the power-operated means to the jack including a dog, a carrier on which the dog is arranged for gripping engagement with the jack, a member which operates on the dog to bring it into gripping engagement with the jack and thereafter operates to swing the jack to a predetermined extent, and a member against which the toe end of the last is positioned to locate it relatively to the upper for the beginning of the upper-tensioning operation.

44. A machine for shaping uppers over lasts having in combination means for gripping the forepart of an upper, a jack for supporting a last and an upper thereon, power-operated means, a jack-engaging dog through which said power-operated means operates to move the jack in a direction to tension the upper lengthwise thereof, another jack-engaging dog through which said power-operated means operates to move the jack in the opposite direction to force the toe end of the last into the toe end of the upper, and a carrier for both dogs.

45. A machine for shaping uppers over lasts having in combination means for gripping the forepart of an upper, a jack for supporting a last and an upper thereon, power-operated means, a jack-engaging dog through which said power-operated means operates to move the jack in a direction to tension the upper lengthwise thereof, another jack-engaging dog through which said power-operated means operates to move the jack in the opposite direction to force the toe end of the last into the toe end of the upper, and a carrier for both dogs, said dogs being held away from the jack when the machine is at rest.

46. A machine for shaping uppers over lasts having in combination means for supporting the forepart of an upper, a jack for supporting the rear part of a last and an upper thereon, power-operated means for moving the jack in a direction to force the toe end of the last into the toe end of the upper, operating connections from said power-operated means to the jack including a jack-engaging dog, yielding means for rendering the dog effective, and power-operated means for rendering the dog ineffective.

47. A machine for shaping uppers over lasts having in combination a support for a last and an upper thereon, a gripper for engaging an outsole attaching extension of the upper at its forepart, a wiper for wiping an insole attaching extension of the upper in over the margin of an insole on the last bottom, means for swinging the support in a direction to tension the upper lengthwise thereof while the forepart is held by the gripper, and a depressor for forcing the forepart of the last into the forepart of the upper while the upper is held under tension.

48. A machine for shaping uppers over lasts having in combination a support for a last and an upper thereon, means for gripping the forepart of the upper, means for swinging the support in a direction to tension the upper lengthwise thereof while the forepart is held by the gripping means, a depressor for forcing the forepart of the last into the forepart of the upper while the upper is held under tension, and means for forcing the toe end of the last lengthwise thereof into the toe end of the upper.

49. A machine for shaping uppers over lasts having in combination means for gripping the forepart of an upper mounted on a last, a work support including a last pin which is yieldingly supported and movable heightwise of the upper, means for swinging the work support in a direction to tension the upper lengthwise thereof while the forepart is held by the gripping means, a depressor for forcing the forepart of the last into the forepart of the upper while the upper is held under tension, and means for forcing the toe end of the last lengthwise thereof into the toe end of the upper.

50. A machine for shaping uppers over lasts having in combination a support for a last and an upper thereon, a gripper for engaging an outsole attaching extension of the upper at its forepart, a member for forcing the bottom margin of the upper against the last and the edge face of an insole thereon, a wiper for wiping an insole attaching extension of the upper in over the margin of the insole, means for swinging the support in a direction to tension the upper lengthwise while the forepart is held by the gripper, a depressor for forcing the forepart of the last into the forepart of the upper while the upper is held under tension, and means for forcing the toe end of the last lengthwise thereof into the toe end of the upper and pressing the toe end of the upper against said member.

51. A machine for shaping uppers over lasts having in combination means for gripping the forepart of an upper on a last, a jack for supporting the last and upper, said jack being freely movable in the direction of the length of the upper when the machine is at rest to permit the forepart of the upper to be positioned relatively to the gripping means, means for moving the jack in a direction to tension the upper lengthwise thereof while the forepart is held by the gripping means, a depressor for forcing the forepart of the last into the forepart of the upper while the upper is held under tension, and means for forcing the toe end of the last lengthwise thereof into the toe end of the upper.

52. In a machine for shaping uppers over lasts, a pair of end-embracing plates for forcing the bottom margin of an upper against a last and the edge face of an insole thereon, and a pair of end-embracing upper-indenting plates for simulating a welt crease in the upper carried by said end-embracing plates, each pair of plates being invertible independently of the other pair.

53. In a machine for shaping uppers over lasts, a pair of end-embracing plates for forcing the bottom margin of an upper against a last and the edge face of an insole thereon, a pair of carriers on which said plates are invertibly mounted, and a pair of end-embracing upper-indenting plates for simulating a welt crease in the upper constructed and arranged to be removably mounted on those surfaces of said end-embracing plates which are uppermost in the machine, said upper-indenting plates being invertible independently of the end-embracing plates.

54. In a machine for shaping uppers over lasts, a member for forcing the bottom margin of the upper against a last and the edge face of an insole thereon, a gripper for engaging an outsole-attaching extension of the upper, and a holder for the gripper which is adjusted in mounting said member in the machine to orient the gripper relatively to the work.

55. In a machine for shaping uppers over lasts, a pair of upper-embracing plates for forcing the bottom margin of an end portion of an upper against a last and the edge face of an insole thereon, a plurality of grippers for engaging an outsole-attaching extension of the upper, and a holder for each gripper constructed and arranged to be adjusted by mounting the upper-embracing plates in the machine to orient the grippers relatively to the work.

56. In a machine for shaping uppers over lasts, a member for forcing the bottom margin of an upper against a last and the edge face of an insole thereon, a gripper for engaging an outsole-attaching extension of the upper, a wiper for wiping an insole-attaching extension of the upper in over the margin of the insole, and a holder for said gripper and wiper, said holder and said member being so constructed and arranged that the holder is adjusted by mounting the member in the machine to orient the gripper and the wiper relatively to the work.

57. In a machine for shaping uppers over lasts, a plurality of grippers constructed and arranged to operate on an outsole-attaching extension of an upper, a holder for each gripper, and a pair of carriers for the gripper holders constructed and arranged for swinging movement about a common axis, one of said holders being pivotally mounted between adjacent end portions of the carriers.

58. In a machine for shaping uppers over lasts, a toe gripper constructed and arranged to operate on an outsole-attaching extension of an upper, a plurality of side grippers constructed and arranged to operate on said outsole-attaching extension, a pair of carriers for said grippers constructed and arranged for swinging movement about a common axis adjacent to the toe end of an upper in the machine, and a holder for the toe gripper pivotally mounted between adjacent end portions of the carriers.

ROBERT H. LAWSON.